(12) United States Patent
Dejneka et al.

(10) Patent No.: US 11,970,421 B2
(45) Date of Patent: Apr. 30, 2024

(54) STRENGTHENED 3D PRINTED SURFACE FEATURES AND METHODS OF MAKING THE SAME

(71) Applicant: CORNING INCORPORATED, Corning, NY (US)

(72) Inventors: Matthew John Dejneka, Corning, NY (US); Seyed Amir Farzadfar, Corning, NY (US); Michael Thomas Gallagher, Painted Post, NY (US); Balamurugan Meenakshi Sundaram, Painted Post, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 532 days.

(21) Appl. No.: 17/415,277

(22) PCT Filed: Dec. 5, 2019

(86) PCT No.: PCT/US2019/064605
§ 371 (c)(1),
(2) Date: Jun. 17, 2021

(87) PCT Pub. No.: WO2020/131400
PCT Pub. Date: Jun. 25, 2020

(65) Prior Publication Data
US 2022/0024817 A1    Jan. 27, 2022

Related U.S. Application Data

(60) Provisional application No. 62/783,761, filed on Dec. 21, 2018.

(51) Int. Cl.
*C03C 17/02*    (2006.01)
*B33Y 10/00*    (2015.01)
(Continued)

(52) U.S. Cl.
CPC ............ *C03C 21/002* (2013.01); *B33Y 10/00* (2014.12); *B33Y 40/20* (2020.01); *B33Y 80/00* (2014.12);
(Continued)

(58) Field of Classification Search
None
See application file for complete search history.

(56) References Cited

U.S. PATENT DOCUMENTS 3,619,240 A * 11/1971 Toussaint ................ C03C 21/00
427/236
3,849,097 A * 11/1974 Giffen ..................... C03C 17/02
65/121
(Continued)

FOREIGN PATENT DOCUMENTS

CN    101348322 A    1/2009
CN    104401002 A *  3/2015
(Continued)

OTHER PUBLICATIONS

"Standard Test Methods for Instrumental Measurement of Distinctness-of-Image Gloss of Coating Surface", In ASTM procedure D5767, 2004, 6 pages.
(Continued)

*Primary Examiner* — Jeffrey A Vonch
(74) *Attorney, Agent, or Firm* — William M. Johnson; Payal A. Patel

(57) ABSTRACT

Glass articles including one or more 3D printed surface features attached to a surface of a substrate at a contact interface between the 3D printed surface feature and the surface. The 3D printed surface feature(s) include a glass or a glass-ceramic, a compressive stress region at an exterior perimeter surface of the 3D printed surface feature(s), and a central tension region interior of the compressive stress
(Continued)

region. The 3D printed surface feature(s) may be formed of a contiguous preformed material 3D printed on a surface of a substrate. The compressive stress region of a 3D printed surface feature may be formed using an ion-exchange process.

20 Claims, 14 Drawing Sheets

(51) Int. Cl.
 *B33Y 40/20* (2020.01)
 *B33Y 80/00* (2015.01)
 *C03B 19/01* (2006.01)
 *C03C 21/00* (2006.01)
 *B23K 26/00* (2014.01)
 *B23K 26/34* (2014.01)
 *B23K 103/00* (2006.01)

(52) U.S. Cl.
 CPC .............. *C03B 19/01* (2013.01); *C03C 17/02* (2013.01); *B23K 26/0006* (2013.01); *B23K 26/34* (2013.01); *B23K 2103/54* (2018.08); *Y10T 428/24182* (2015.01); *Y10T 428/24479* (2015.01); *Y10T 428/2457* (2015.01); *Y10T 428/24926* (2015.01); *Y10T 428/315* (2015.01)

(56) References Cited

U.S. PATENT DOCUMENTS

| | | | | |
|---|---|---|---|---|
| 4,178,082 A * | 12/1979 | Ganswein | C03B 35/005 | 65/30.14 |
| 4,518,222 A * | 5/1985 | Borrelli | C03C 21/002 | 359/620 |
| 4,784,679 A * | 11/1988 | Lentz | C03B 17/025 | 65/121 |
| 4,842,630 A * | 6/1989 | Braithwaite | C03B 9/31 | 65/60.8 |
| 5,123,722 A * | 6/1992 | Meymand | B44F 1/06 | 359/619 |
| 8,991,211 B1 * | 3/2015 | Arlotti | C03B 19/06 | 65/17.3 |
| 9,593,042 B2 | 3/2017 | Hu et al. | | |
| 9,896,368 B2 | 2/2018 | Klein et al. | | |
| 2002/0135281 A1 * | 9/2002 | Goda | G02B 5/226 | 313/112 |
| 2003/0129546 A1 * | 7/2003 | Mitsui | C03C 17/008 | 313/582 |
| 2004/0126698 A1 * | 7/2004 | Borrelli | C03C 4/04 | 359/620 |
| 2009/0266407 A1 * | 10/2009 | Harder | H01L 31/02366 | 65/106 |
| 2010/0246016 A1 | 9/2010 | Carlson et al. | | |
| 2010/0285272 A1 * | 11/2010 | Koval | C03C 21/002 | 427/166 |
| 2011/0039072 A1 * | 2/2011 | Grzybowski | C03B 23/02 | 428/156 |
| 2011/0062849 A1 | 3/2011 | Carlson et al. | | |
| 2011/0183118 A1 * | 7/2011 | Lamberson | C03C 21/002 | 501/24 |
| 2011/0256329 A1 * | 10/2011 | Thomas | F42B 15/34 | 428/34.4 |
| 2011/0267697 A1 | 11/2011 | Kohli et al. | | |
| 2011/0267698 A1 | 11/2011 | Guilfoyle et al. | | |
| 2012/0034435 A1 | 2/2012 | Borrelli et al. | | |
| 2012/0214004 A1 * | 8/2012 | Hashimoto | C03C 21/002 | 428/428 |
| 2012/0237745 A1 * | 9/2012 | Dierkes | C04B 35/4885 | 427/532 |
| 2012/0247063 A1 * | 10/2012 | Grzybowski | C03C 23/005 | 52/786.13 |
| 2012/0281292 A1 | 11/2012 | Baca et al. | | |
| 2013/0115422 A1 * | 5/2013 | Murata | C03C 1/004 | 501/72 |
| 2013/0273320 A1 * | 10/2013 | Bockmeyer | C03C 8/02 | 428/147 |
| 2014/0178642 A1 * | 6/2014 | Milanovska | F24C 15/10 | 428/149 |
| 2014/0335637 A1 * | 11/2014 | Lee | C03C 8/16 | 438/29 |
| 2015/0118276 A1 | 4/2015 | Borrelli et al. | | |
| 2015/0174625 A1 * | 6/2015 | Hart | G06F 3/041 | 428/141 |
| 2015/0198752 A1 | 7/2015 | Lander et al. | | |
| 2015/0299035 A1 * | 10/2015 | Kuksenkov | G02B 1/118 | 65/17.2 |
| 2015/0299036 A1 * | 10/2015 | Ukrainczyk | C03C 10/0027 | 65/33.1 |
| 2015/0307385 A1 * | 10/2015 | Klein | C03B 19/00 | 65/29.11 |
| 2015/0368148 A1 * | 12/2015 | Duffy | C03C 4/18 | 428/220 |
| 2016/0002104 A1 * | 1/2016 | Lehuede | C03C 8/14 | 65/30.14 |
| 2016/0185657 A1 * | 6/2016 | Sakoske | C03C 8/20 | 428/428 |
| 2016/0194233 A1 * | 7/2016 | Van Pelt | C03B 19/00 | 65/32.4 |
| 2016/0207820 A1 * | 7/2016 | Cleary | B32B 17/10743 | |
| 2016/0280594 A1 * | 9/2016 | Muehlke | B23K 26/355 | |
| 2016/0376190 A1 * | 12/2016 | Karagoez | C09D 1/00 | 427/508 |
| 2017/0022102 A1 * | 1/2017 | Masters | C03B 23/02 | |
| 2017/0205541 A1 * | 7/2017 | Amin | G02B 5/0278 | |
| 2017/0217831 A1 * | 8/2017 | Hart | C03C 17/2453 | |
| 2017/0247284 A1 * | 8/2017 | Miyasaka | C03C 3/091 | |
| 2017/0283298 A1 | 10/2017 | Hawtof et al. | | |
| 2018/0029927 A1 * | 2/2018 | Ishihara | C03C 17/008 | |
| 2018/0036945 A1 * | 2/2018 | Lereboullet | C03B 19/06 | |
| 2018/0072606 A1 | 3/2018 | Chou et al. | | |
| 2018/0099904 A1 * | 4/2018 | Park | C03C 15/00 | |
| 2018/0118610 A1 | 5/2018 | Hanawa et al. | | |
| 2018/0149793 A1 * | 5/2018 | Gollier | C03C 15/00 | |
| 2018/0162091 A1 * | 6/2018 | Takeda | G02B 1/113 | |
| 2018/0194662 A1 | 7/2018 | Kim et al. | | |
| 2018/0237325 A1 | 8/2018 | Li et al. | | |
| 2018/0237329 A1 | 8/2018 | Drewnowski et al. | | |
| 2018/0304825 A1 * | 10/2018 | Mattelet | B60K 37/00 | |
| 2018/0363361 A1 * | 12/2018 | Heckman | C03B 23/245 | |
| 2019/0023611 A1 * | 1/2019 | Luzzato | C03C 21/002 | |
| 2019/0152828 A1 * | 5/2019 | Kübler | G06F 3/041 | |
| 2019/0256406 A1 * | 8/2019 | Aitken | C03C 3/16 | |
| 2019/0263713 A1 * | 8/2019 | Murayama | C03B 23/0302 | |
| 2019/0315653 A1 * | 10/2019 | Lance | C03C 23/0025 | |
| 2019/0352210 A1 | 11/2019 | Drewnowski et al. | | |
| 2020/0014780 A1 * | 1/2020 | Jones | H04N 23/54 | |
| 2020/0024465 A1 * | 1/2020 | Dylla-Spears | B33Y 70/10 | |
| 2020/0039868 A1 * | 2/2020 | Rapp | B33Y 70/10 | |
| 2020/0064535 A1 * | 2/2020 | Haan | G02B 6/0078 | |
| 2020/0101907 A1 * | 4/2020 | Mattelet | B60R 13/0262 | |
| 2020/0132521 A1 * | 4/2020 | Akiba | C03C 17/28 | |
| 2020/0189973 A1 * | 6/2020 | Tatebe | C03C 3/083 | |
| 2020/0299183 A1 * | 9/2020 | Mannheim Astete | C03C 8/02 | |
| 2020/0331194 A1 * | 10/2020 | Vennerberg | B29C 64/295 | |
| 2020/0389991 A1 * | 12/2020 | Shannon | C03C 15/00 | |
| 2021/0016493 A1 * | 1/2021 | Bracha | C03B 29/02 | |
| 2021/0268789 A1 | 9/2021 | Jones et al. | | |
| 2021/0292216 A1 | 9/2021 | Li et al. | | |
| 2021/0379870 A1 * | 12/2021 | Tanaka | C03C 3/087 | |

FOREIGN PATENT DOCUMENTS

| | | | | |
|---|---|---|---|---|
| CN | 104893410 A * | 9/2015 | ............. | C09D 11/03 |
| CN | 105731769 A * | 7/2016 | ............. | B33Y 10/00 |
| CN | 105776880 A * | 7/2016 | ........... | C03C 17/006 |
| CN | 105814759 A | 7/2016 | | |
| CN | 206927792 U | 1/2018 | | |
| CN | 107735372 A | 2/2018 | | |
| CN | 107922233 A | 4/2018 | | |
| CN | 108147673 A * | 6/2018 | ................ | C03C 12/00 |

(56) References Cited

FOREIGN PATENT DOCUMENTS

| | | | | |
|---|---|---|---|---|
| CN | 108821568 A | * | 11/2018 | ............. C03B 19/02 |
| DE | 102013110564 A1 | * | 3/2015 | ............. C03B 23/02 |
| EP | 805126 A1 | * | 11/1997 | ............. C03C 17/04 |
| EP | 1384520 A2 | * | 1/2004 | ........... C03C 17/007 |
| EP | 3042751 A1 | | 7/2016 | |
| JP | 02-263739 A | | 10/1990 | |
| JP | 04164824 A | * | 6/1992 | ............. C03B 19/12 |
| JP | 04240134 A | * | 8/1992 | ............. C03B 19/12 |
| JP | 05307125 A | * | 11/1993 | ......... C03B 19/1453 |
| JP | 2007217969 A | * | 8/2007 | |
| JP | 2014234341 A | * | 12/2014 | |
| JP | 2015-098426 A | | 5/2015 | |
| WO | WO-2013163238 A1 | * | 10/2013 | ................ B60J 1/00 |
| WO | WO-2014010599 A1 | * | 1/2014 | ............. C03B 33/04 |
| WO | WO-2016137956 A1 | * | 9/2016 | ............. B28B 1/001 |
| WO | WO-2017027784 A1 | * | 2/2017 | ........... B23K 26/342 |
| WO | WO-2017027788 A1 | * | 2/2017 | ............. B32B 17/06 |
| WO | WO-2017159410 A1 | * | 9/2017 | ............. C03B 11/00 |
| WO | WO-2017159411 A1 | * | 9/2017 | ............. B32B 17/00 |
| WO | 2018/002001 A1 | | 1/2018 | |
| WO | 2018/094142 A1 | | 5/2018 | |
| WO | 2019/055581 A1 | | 3/2019 | |
| WO | WO-2019202333 A1 | * | 10/2019 | ............. A61K 6/807 |

OTHER PUBLICATIONS

"Standard Test Method for Measurement of Glass Stress-Optical Coefficient", ASTM standard C770-98, 2013.

Klein et al., "Additive Manufacturing of Optically Transparent Glass", 3D Printing and Additive Manufacturing, 2015, 96 pages.

Luo et al., "Additive manufacturing of transparent fused quartz", Optical Engineering, vol. 57, No. 4, 2018, 10 pages.

Nguyen et al., "3D-Printed Transparent Glass", In Adv. Mater. 2017, 1701181, 16 pages.

International Search Report and Written Opinion of the International Searching Authority; PCT/US2019/064605; dated Mar. 27, 2020; 9 pages; European Patent Office.

Chinese Patent Application No. 201911337910.8, Office Action dated Dec. 1, 2022, 5 pages of English Translation only, Chinese Patent Office.

* cited by examiner

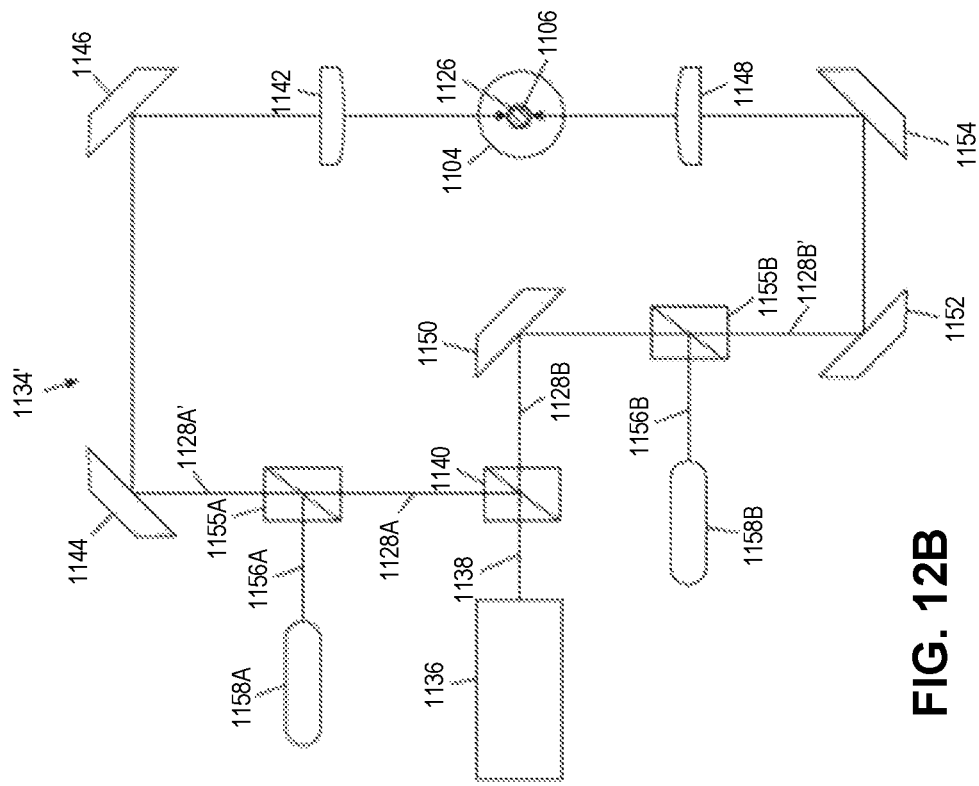
FIG. 12B
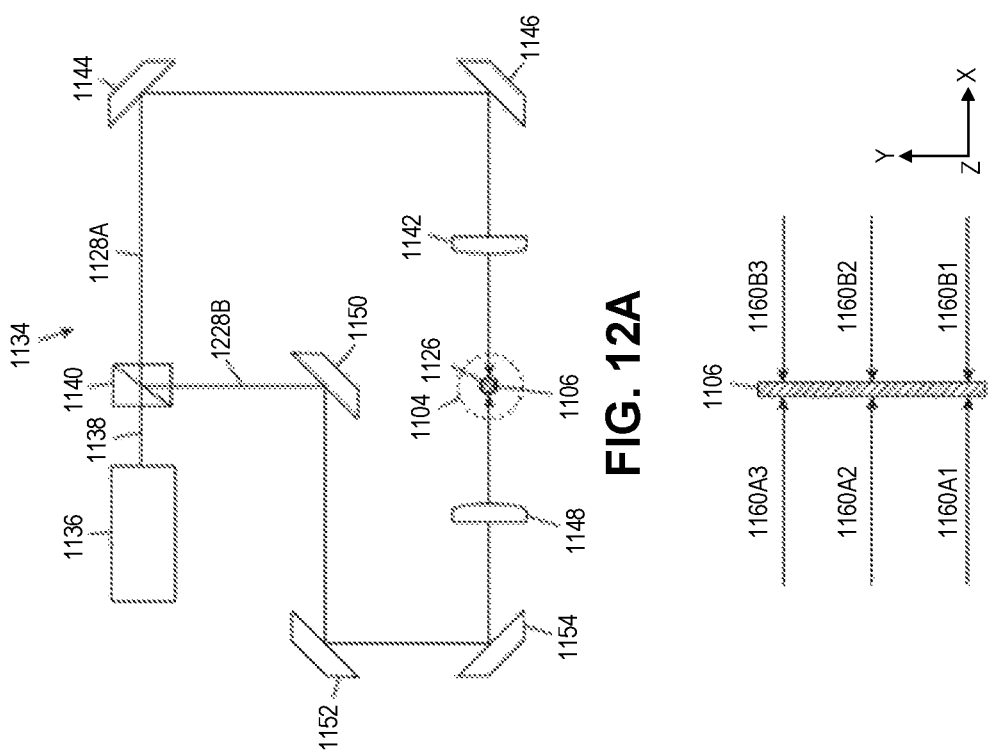
FIG. 12A
FIG. 12C

# STRENGTHENED 3D PRINTED SURFACE FEATURES AND METHODS OF MAKING THE SAME

CROSS-REFERENCE TO RELATED APPLICATIONS

This application is a national stage application under 35 U.S.C. § 371 of International Application No. PCT/US2019/064605, filed on Dec. 5, 2019, which claims the benefit of priority under 35 U.S.C. § 119 of U.S. Provisional Application Ser. No. 62/783,761 filed on Dec. 21, 2018 the content of which is relied upon and incorporated herein by reference in its entirety.

BACKGROUND

Field

The present disclosure relates to glass articles including ion-exchanged 3D printed glass or glass-ceramic surface features. In particular, the present disclosure relates to optimizing the adhesive bond strength between a 3D printed glass or glass-ceramic surface feature and a surface of a substrate using an ion-exchange process.

Background

In recent years, consumer products, including automobile interior components, have been incorporating more touch screen and deadfront type control displays and less push-button and knob oriented controls. Such consumer products utilize cover substrates, such as cover glass, to protect the electronic components of these products.

Additive manufacturing, popularly referred to as "3D printing," allows 3D parts to be built directly from a computer-aided design (CAD) model of the part. The 3D part is built layer by layer, which allows features to be built into each layer and contained within the part as internal features if so desired. Additive manufacturing can work with solid, liquid, and powder materials.

SUMMARY

The present disclosure is related to glass articles for providing a tactile feel on a surface of the glass articles. The tactile feel may facilitate user interaction with a display incorporating a glass article disclosed herein. The tactile feel is provided by at least one 3D printed surface feature disposed on a surface of a glass article. The adhesion bond strength between the 3D printed surface feature(s) and a surface of a substrate may be enhanced by the formation of a compressive stress region in the 3D printed surface feature(s) and/or on the surface of the substrate. The formation of such a compressive stress region facilitates the use of glass articles disclosed herein for various applications by improving the mechanical properties of a 3D printed surface feature and the interface between a 3D printed surface feature and a substrate.

In a first aspect, a glass article is described, the glass article including a substrate having a surface, a 3D printed surface feature disposed on the surface, the 3D printed surface feature attached to the surface at a contact interface between the 3D printed surface feature and the surface, and the 3D printed surface feature including a glass or a glass-ceramic, a compressive stress region at an exterior perimeter surface of the 3D printed surface feature, and a central tension region interior of the compressive stress region.

In a second aspect, the 3D printed surface feature of the glass article according to aspects of the preceding paragraph may include the glass and the glass comprises an ion-exchangeable glass material. In a third aspect, the 3D printed surface feature of the glass article according to aspects of the preceding paragraph may include the glass-ceramic and the glass-ceramic comprises an ion-exchangeable glass-ceramic material.

In a fourth aspect, the 3D printed surface feature of the glass article according to aspects of any of the preceding paragraphs may include a contiguous preformed material.

In a fifth aspect, the contact interface of the glass article according to aspects of any of the preceding paragraphs has a minimum contact dimension, the compressive stress region has a maximum depth measured inward from the exterior perimeter surface at a direction orthogonal to the exterior perimeter surface, and the minimum contact dimension is at least three times greater than the maximum depth of the compressive stress region. In a sixth aspect, the minimum contact dimension is at least four times greater than the maximum depth of the compressive stress region.

In a seventh aspect, the compressive stress region of the glass article according to aspects of any of the preceding paragraphs has a compressive stress of 400 MPa or more.

In an eighth aspect, the compressive stress region of the glass article according to aspects of any of the preceding paragraphs has a compressive stress of 500 MPa or more.

In a ninth aspect, the compressive stress region of the glass article according to aspects of any of the preceding paragraphs has a compressive stress of 700 MPa or more.

In a tenth aspect, the compressive stress region of the glass article according to aspects of any of the preceding paragraphs has a minimum depth of 10 microns or more.

In an eleventh aspect, the compressive stress region of the glass article according to aspects of any of the preceding paragraphs has a minimum depth of 20 microns or more.

In a twelfth aspect, the surface of the substrate of the glass article according to aspects of any of the preceding paragraphs includes an ion-exchangeable glass material or an ion-exchangeable glass-ceramic material.

In a thirteenth aspect, the substrate of the glass article according to aspects of any of the preceding paragraphs includes a compressive stress region at the surface. In a fourteenth aspects, the compressive stress region at the surface of the substrate and the compressive stress region at the exterior perimeter surface of the 3D printed feature are portions of a continuous compressive stress region.

In a fifteenth aspect, the glass article according to aspects of any of the preceding paragraphs includes a coating layer disposed over the 3D printed surface feature.

In a sixteenth aspect, the glass article according to aspects of any of the preceding paragraphs includes a color layer. In a seventeenth aspect, the color layer is disposed on a bottom surface of the substrate opposite the surface on which the 3D printed surface feature is disposed.

In an eighteenth aspect, the 3D printed surface feature of the glass article according to aspects of any of the preceding paragraphs includes a colored glass or a colored glass-ceramic.

In a ninetieth aspect, the substrate of the glass article according to aspects of any of the preceding paragraphs is a curved substrate.

In a twentieth aspects, the glass article according to aspects according to any of the preceding paragraphs may include a contact angle between the 3D printed surface feature and the substrate at the contact interface is less than 135 degrees.

In a twenty-first aspect, a method of making a glass article is described, the method including 3D printing a glass or glass-ceramic feature on a surface of a substrate and forming a compressive stress region at an exterior perimeter surface of the 3D printed glass or glass-ceramic feature.

In a twenty-second aspect, the glass or glass-ceramic feature of the method according to aspects of the preceding paragraph includes a an ion-exchangeable glass material or ion-exchangeable glass-ceramic material.

In a twenty-third aspect, the method according to aspects of either of the two preceding paragraphs may include forming the compressive stress region by ion-exchanging the 3D printed glass or glass-ceramic feature on the surface of the substrate.

In a twenty-fourth aspect, the glass or glass-ceramic surface feature according to aspects of any of the three preceding paragraphs includes a contiguous preformed material.

In a twenty-fifth aspect, the method according to aspects of any of the four preceding paragraphs includes 3D printing the glass or glass-ceramic surface feature on the surface of the substrate attaches the glass or glass-ceramic surface feature to the surface at a contact interface between the glass or glass-ceramic surface feature and the surface, where the contact interface has a minimum contact dimension, the compressive stress region has a maximum depth measured inward from the exterior perimeter surface at a direction orthogonal to the exterior perimeter surface, and the minimum contact dimension is at least three times greater than the maximum depth of the compressive stress region. In a twenty-sixth aspect, the minimum contact dimension is at least four times greater than the maximum depth of the compressive stress region.

In a twenty-seventh aspect, the method according to aspects of any of the preceding five paragraphs includes 3D printing by creating a hot spot in a build zone located between a feed outlet and the substrate and feeding one or more preformed materials in a predetermined sequence through the feed outlet into the build zone and using the hot spot to selectively heat the one or more preformed materials to a viscous state. In a twenty-eighth aspect, creating the hot spot includes directing at least one energy source into the build zone.

In a twenty-ninth aspect, a method of making a glass article is described, the method including creating a hot spot in a build zone located between a feed outlet and a substrate, where creating the hot spot comprises directing at least one energy source into the build zone; feeding a contiguous preformed glass or glass-ceramic material through the feed outlet into the build zone and using the hot spot to selectively heat the preformed material to a viscous state having a viscosity in the range of $10^4$ poises to $10^{7.6}$ poises; and forming a surface feature on a surface of the substrate by depositing a portion of the preformed material on the surface from the build zone and effecting a relative motion between the surface and the feed outlet during the depositing such that the first portion of preformed material forms the surface feature.

In a thirtieth aspect, the method according to aspects of the preceding paragraph includes varying the viscosity of the preformed material during the feeding. In a thirty-first aspect, the at least one energy source includes at least one laser beam and the viscosity of the preformed material is varied by varying a total input energy of the at least one laser beam, where the total input energy is defined by at least: a laser power of the at least one laser beam, a laser beam diameter of the at least one laser beam, a movement speed of the substrate, and a feed rate of the contiguous preformed glass or glass-ceramic material.

In a thirty-second aspect, the method according to aspects of either of the two preceding paragraphs may include varying the viscosity of the preformed material by varying a feed rate of the preformed material.

In a thirty-third aspect, forming of the surface feature on the surface of the substrate in the method according to aspects of any of the three preceding paragraphs creates a contact interface between the substrate and the surface feature, and the contact interface includes a contact angle of less than 135 degrees.

In a thirty-fourth aspect, a vehicle interior is described, the vehicle interior including a vehicle base and a display mounted on the vehicle base, the display including a display module disposed over a bottom surface of a substrate, the substrate including a 3D printed surface feature disposed on a top surface of the substrate opposite the bottom surface, the 3D printed surface feature attached to the top surface at a contact interface between the 3D printed surface feature and the second surface, and the 3D printed surface feature including a glass or a glass-ceramic, a compressive stress region at an exterior perimeter surface of the 3D printed feature, and a central tension region interior of the compressive stress region.

In a thirty-fifth aspect, the display module of the vehicle interior according to aspects of the preceding paragraph is configured to display a graphic that may be viewed through the top surface of the substrate and the 3D printed surface feature is disposed on the top surface of the substrate in a complimentary fashion to the graphic. In a thirty-sixth aspect, the graphic includes an icon.

In a thirty-seventh aspect, the vehicle base of the vehicle interior according to aspects of either of the preceding two paragraphs includes a center console, a dashboard, a steering wheel, an arm rest, a pillar, a seat back, a floor board, a headrest, or a door panel.

BRIEF DESCRIPTION OF THE DRAWINGS

FIG. 12A shows a laser delivery system according to some embodiments. FIG. 12B shows a laser delivery system according to some embodiments. FIG. 12C shows multi-path laser delivery according to some embodiments.

DETAILED DESCRIPTION

Figure 1:
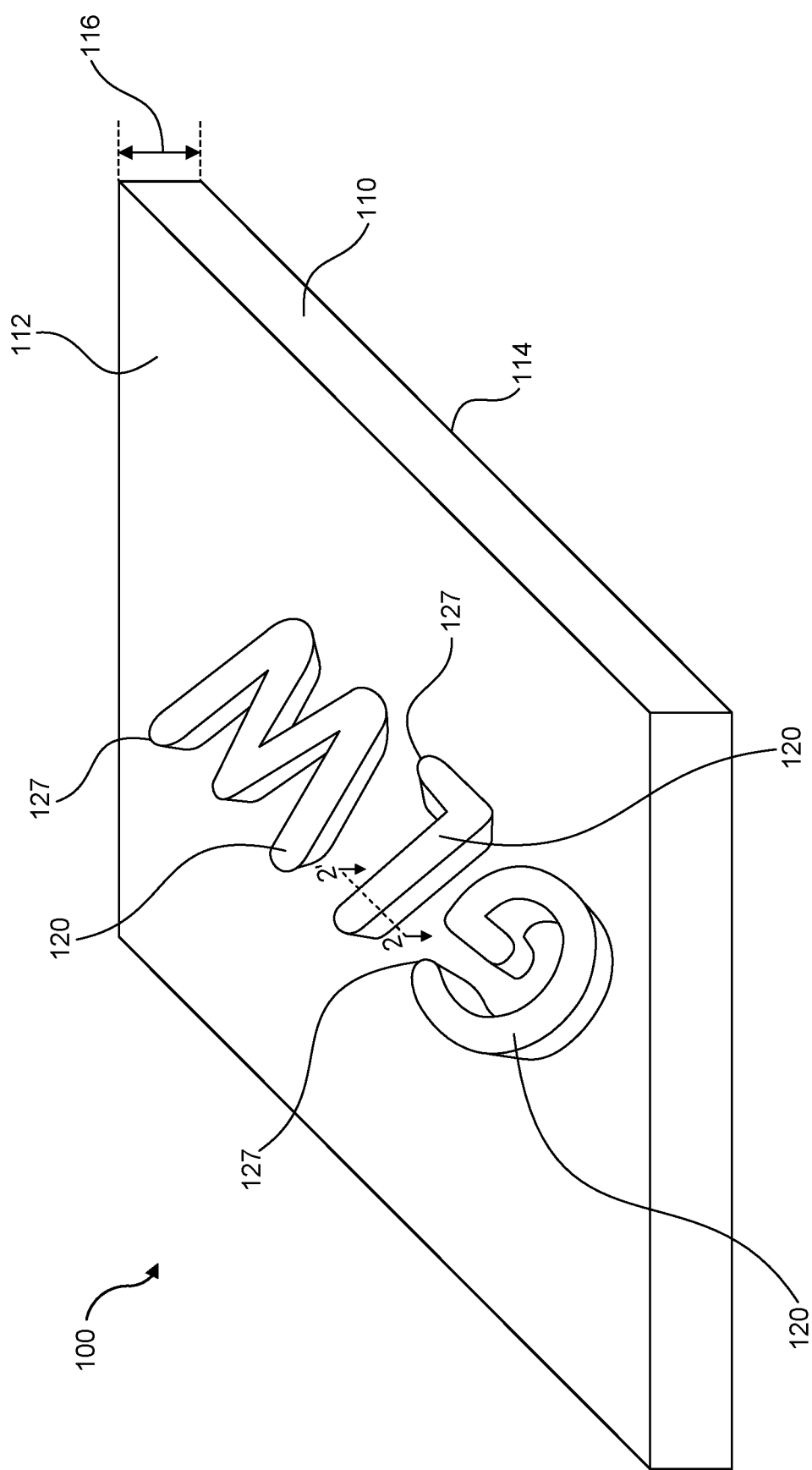
FIG. 1 shows a glass article according to some embodiments.

Cover substrates for consumer products, for example cover glasses, may serve to, among other things, reduce undesired reflections, prevent formation of mechanical defects in the glass (e.g., scratches or cracks), and/or provide an easy-to-clean transparent surface. The glass articles disclosed herein may be incorporated into another article such as an article with a display (or display articles) (e.g., consumer electronic products, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance, or a combination thereof.

Cover substrates, such as cover glasses, also serve to protect sensitive components of a consumer product from mechanical damage (e.g., puncture and impact forces). For consumer products including a flexible, foldable, and/or sharply curved portion (e.g., a flexible, foldable, and/or sharply curved display screen), a cover substrate for protecting the display screen should preserve the flexibility, foldability, and/or curvature of the screen while also protecting the screen. Moreover, the cover substrate should resist mechanical damage, such as scratches and fracturing, so that a user can enjoy an unobstructed view of the display screen.

Various embodiments of the present disclosure relate to glass articles for use as cover substrates with areas of tactile feel on a surface. As the use of touch screen and deadfront types displays increases, the importance of aesthetic features and the integration of form and function, also increases. A glass article that facilitates both visual and tactile interaction with a user makes interaction with a screen or display more convenient for a user.

Processing methods disclosed herein improve the adhesion between a 3D printed surface feature and a substrate of a glass article. To determine processing methods that improve the adhesion, the adhesive bond strength (ABS) between a 3D printed surface feature a substrate was characterized. High adhesive bond strength between a 3D printed surface feature and a substrate is desirable because it extends the lifetime of an article including a 3D printed surface feature attached to a substrate. Also, high adhesive bond strength may be necessary for a glass article to successfully pass the safety requirements for applications where formation and presence of glass debris is unacceptable. One example of such an application is in an automobile interior where the formation of glass debris during a crash test is deemed unsafe. Test results for the strength of an adhesive bond between a 3D printed surface feature and a substrate disclosed herein show that the formation of a compressive stress region (e.g., formed via an ion-exchanged process) at an exterior surface of a surface feature improves the adhesive bond strength between the 3D printed surface feature and the substrate. High adhesive bond strength may also facilitate the use of glass articles in flexible devices, such as flexible or foldable display screens.

In some embodiments, adhesive bond strength can be improved by controlling the contact interface between a 3D printed surface feature and a substrate, and the depth of a compressive stress region in the 3D printed surface feature. Controlling the relative size of the contact interface and the depth of a compressive stress region can be utilized to optimize the adhesive bond strength for a 3D printed surface feature. Chemical post-processing (ion-exchange processing) of glass articles disclosed herein using salt bath compositions disclosed herein enhances the adhesive bond strength via exchange of target ions in one or more glass materials used to form a 3D printed surface feature and a substrate. In some embodiments, adhesive bond strength can be improved by controlling the viscosity of a preformed material deposited during a 3D printing method disclosed herein.

Glass articles disclosed herein may provide an enhanced haptic (tactile) user experience. Products fabricated and characterized using the processes described herein may be utilized in various applications, such as automotive interiors and mobile devices to provide advanced haptic feedback. The presence of 3D printed surface features on a substrate enhances haptic user experience as a unique form of user communication with a device, such as a driver's communication to a vehicle.

In some embodiments, glass articles disclosed herein may be colored for aesthetic and/or functional purposes. Color may provide desired aesthetic effects, such as an aesthetic color and/or pattern. In some embodiments, color may provide a functional visual effect for a user. For example, color may be utilized to visually differentiate a portions of a glass article from another portion. In some embodiments, a colored glass article may include colored glass. For example, a colored glass article may be made with preformed material from colored glass feedstock or a colored glass article may include a colored glass substrate. In some embodiments, a colored glass article may include a colored layer disposed over one or more surfaces of the glass article.

FIG. 1 shows a glass article 100 according to some embodiments. Glass article 100 includes a substrate 110 having a top surface 112, a bottom surface 114, and a thickness 116 measured between top surface 112 and bottom surface 114. One or more 3D printed surface features 120 are disposed on top surface 112. In some embodiments, 3D printed surface feature(s) 120 may be made of a contiguous preformed material (e.g., preformed material 1106 shown in FIG. 11). In some embodiments, top surface 112 may be a user-facing, top surface of substrate 110. A substrate 110 on which 3D printed surface features 120 are printed may be referred to herein as a build plate (e.g., build plate 1102) and the top surface of such a substrate 110 may be referred to as a build surface (e.g., build surface 1130).

As used herein, the term "contiguous preformed material" relates to glass, glass-ceramic, and ceramic materials, and combinations of these materials that (a) have been formed or shaped beforehand; and (b) currently reside in a contiguous form that is substantially without the presence of internal defects, inclusions, bubbles and the like that are typically associated with other forms of these materials, such as sintered powder and particulate. A contiguous preformed material may be in the form of a rod, a fiber, a thin sheet, or a ribbon. A contiguous preformed material may be a hollow or non-hollow structure. Exemplary contiguous preformed materials include, but are not limited to, materials formed in the shape of a tube, rod, fiber, or bar having a circular cross-section, an elliptical cross-section, a rectangular cross-section, a square cross-section, or a U-shaped cross-section. A contiguous preformed material may be a continuous preformed material.

Figure 2:
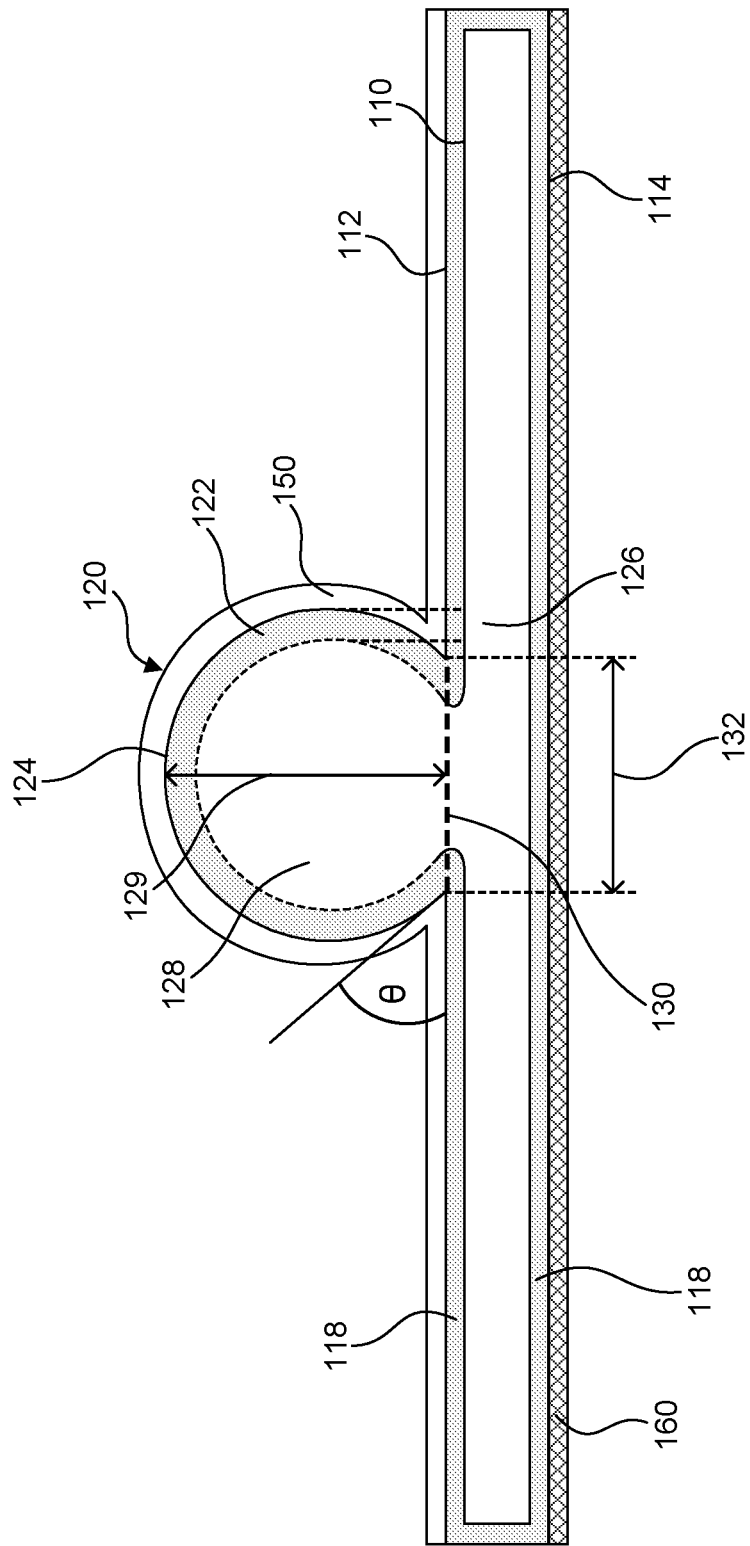
FIG. 2 shows a cross-section of a glass article along the line 2-2' of FIG. 1 according to some embodiments.

As shown in for example FIG. 2, 3D printed surface feature(s) 120 are attached to top surface 112 at a contact interface 130 between 3D printed surface feature(s) 120 and top surface 112. As also shown in FIG. 2, 3D printed surface feature(s) 120 may include a compressive stress region 122 at an exterior perimeter surface 124 of surface feature(s) 120. Compressive stress region 122 is balanced by a central tension region 128 located interior of compressive stress region 122 and exhibiting a tensile stress. Compressive stress region 122 extends from exterior perimeter surface 124 to a depth 126 (called "depth of compression" (DOC)). At the interface between compressive stress region 122 and central tension region 128 (i.e., the depth of compression) the stress within 3D printed surface feature(s) 120 changes from a compressive stress to a tensile stress.

Compressive stress region 122 may be formed by a process, including but not limited to, a thermal tempering process and/or an ion exchange process. In embodiments utilizing an ion exchange process, 3D printed surface feature(s) 120 are composed in whole or in part of an ion-exchangeable glass material or an ion-exchangeable glass-ceramic material. An exemplary thermal tempering process includes heating the glass or glass-ceramic material of substrate 110 and/or 3D printed surface feature(s) 120 to a temperate to attain a viscosity between $10^9$ and $10^{10.5}$ poises, holding at that temperature for a given time determined by part thickness, and rapidly cooling the substrate 110 and/or 3D printed surface feature(s) 120 (e.g., using an air jet).

In embodiments including a compressive stress region 122 formed by an ion exchange process, ions at or near exterior perimeter surface 124 of a 3D printed surface feature 120 are replaced by—or exchanged with—larger ions having the same valence or oxidation state.

Ion exchange processes may be carried out by immersing a glass or glass-ceramic material in a molten salt bath (or two or more molten salt baths) containing the larger ions to be exchanged with the smaller ions in the glass or glass-ceramic material. In some embodiments, an aqueous salt bath may be utilized. The composition of the bath(s) may include more than one type of larger ion (e.g., Na+ and K+) or a single larger ion. It will be appreciated by those skilled in the art that parameters for the ion exchange process including, but not limited to, bath composition and temperature, immersion time, the number of immersions of the glass or glass-ceramic material in a salt bath (or baths), use of multiple salt baths, additional steps such as annealing, washing, and the like, are generally determined by the composition of the glass or glass-ceramic material (including the structure of the material and any crystalline phases present) and the desired DOC and CS (compressive stress) of the material that results from strengthening.

Exemplary molten bath compositions may include nitrates, sulfates, and chlorides of the larger alkali metal ion. Typical nitrates include $KNO_3$, $NaNO_3$, and $LiNO_3$, and combinations thereof. The temperature of the molten salt bath may be in a range from about 380° C. up to about 450° C., while immersion times range from about 15 minutes up to about 100 hours depending on the glass material thickness, bath temperature and glass material (or monovalent ion) diffusivity. However, temperatures and immersion times different from those described above may also be used.

In some embodiments, a 3D printed surface feature 120 on substrate 110 may be immersed in a molten salt bath of 100% $NaNO_3$, 100% $KNO_3$, or a combination of $NaNO_3$ and $KNO_3$ having a temperature from about 370° C. to about 480° C. In some embodiments, a 3D printed surface feature 120 on substrate 110 may be immersed in a molten mixed salt bath including from about 5% to about 90% $KNO_3$ and from about 10% to about 95% $NaNO_3$. In some embodiments, a 3D printed surface feature 120 on substrate 110 may be immersed in a molten mixed salt bath including about 5 wt % $NaNO_3$ and about 95 wt % $KNO_3$. In some embodiments, a 3D printed surface feature 120 on substrate 110 may be immersed in a molten salt bath including about 100 wt % $KNO_3$. In some embodiments, silicic acid (e.g., 0.5 wt %) may be added to a molten salt bath to avoid etching of a 3D printed surface feature during immersion.

In some embodiments, a 3D printed surface feature 120 on substrate 110 may be immersed in a second bath after immersion in a first bath. The first and second baths may have different compositions and/or temperatures from one another. The immersion times in the first and second baths may vary. For example, immersion in the first bath may be longer than the immersion in the second bath.

In some embodiments, a 3D printed surface feature 120 may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.) for less than about 5 hours, or even about 4 hours or less.

Ion exchange conditions can be tailored to provide a "spike" or to increase the slope of the stress profile at or near exterior perimeter surface 124 of a 3D printed surface feature 120. The spike may result in a greater surface CS value. This spike can be achieved by single bath or multiple baths, with the bath(s) having a single composition or mixed composition, due to the unique properties of the glass or glass-ceramic material of a 3D printed surface feature 120.

In some embodiments, where more than one monovalent ion is exchanged into a 3D printed surface feature 120, the different monovalent ions may exchange to different depths within 3D printed surface feature 120 (and generate different magnitudes of stresses within 3D printed surface feature 120 at different depths). The resulting relative depths of the stress-generating ions can be determined and cause different characteristics of the stress profile.

CS may be measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of a glass material. SOC in turn is measured by those methods that are known in the art, such as fiber and four-point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein, CS is the "maximum compressive stress," which is the highest compressive stress value measured within a compressive stress region. In some embodiments, the maximum compressive stress may be located at an exterior perimeter surface of a 3D printed surface feature. In some embodiments, the maximum compressive stress may occur at a depth below the exterior perimeter surface, giving the compressive profile the appearance of a "buried peak."

The contact interface 130 of a 3D printed surface feature 120 has a minimum contact dimension 132. Also, the compressive stress region 122 of a 3D printed surface feature 120 has a depth 126 measured inward from exterior perimeter surface 124 at a direction orthogonal to exterior perimeter surface 124. In some embodiments, the relationship between the minimum contact dimension 132 and the maximum depth 126 of a 3D printed surface feature 120 may be tailored to provide desired mechanical properties (e.g., adhesive bond strength) for a 3D printed surface feature 120. In some embodiments, minimum contact dimension 132 may be at least three times greater than maximum depth 126 of compressive stress region 122. In some embodiments, minimum contact dimension 132 may be at least 3.5 times greater than maximum depth 126 of compressive stress region 122. In some embodiments, minimum contact dimension 132 may be at least four times greater than maximum depth 126 of compressive stress region 122. In some embodiments, minimum contact dimension 132 may be at least 4.5 times greater than maximum depth 126 of compressive stress region 122. In some embodiments, minimum contact dimension 132 may be at least five times greater than maximum depth 126 of compressive stress region 122.

As used herein, the term "maximum depth" means the largest depth of a volume defining a compressive stress region for a 3D printed surface feature. A depth value for a compressive stress region may be measured by a polariscope that uses the principle of photoelasticity to measure retardation (phase shift) of light passing through the test specimen. In this measurement technique, a cross-section of the test specimen is machined and inspected. The retardation measurements are analyzed to determine the stress-free region, which is located at the interface between compressive stress region 122 and central tension region 128.

A depth is measured relative to a point on a surface (e.g., exterior perimeter surface 124) and in a direction orthogonal to the surface at that point. For example, for a curved surface (e.g., a surface including a circular or hemispherical cross-sectional shape), a depth at a point is measured in a direction orthogonal to a line tangential to the curved surface at the point. As another example, for a flat surface (e.g., a surface including a polygonal cross-sectional shape), a depth at a point is measured in a direction orthogonal to the flat surface at the point.

For purposes of calculating a "maximum depth," a representative number of depth measurements at different cross-sections along a 3D printed surface feature's length (e.g., first dimension 134 in FIG. 3) may be performed and the largest value is selected as the "maximum depth." A representative number is at least 2 and, depending on the length of a surface feature, may be more than 2. For a surface feature having a length at least ten times as long as its width, a "maximum depth" is calculated by: (i) performing at least 10 depth measurements each separated by at least 2% of the surface feature's length and no more than 10% of the surface feature's length and (ii) selecting the largest value as the "maximum depth." Generally, relatively more representative measurements are needed for relatively longer surface features. Unless necessary due to the size and/or shape of a surface feature, depth measurements are not performed at a certain distance from the end points (e.g., end points 127 in FIG. 1) of a surface feature to remove any influence due to geometrical changes at the end points, the certain distance being 5% of the surface feature's length.

Figure 3:
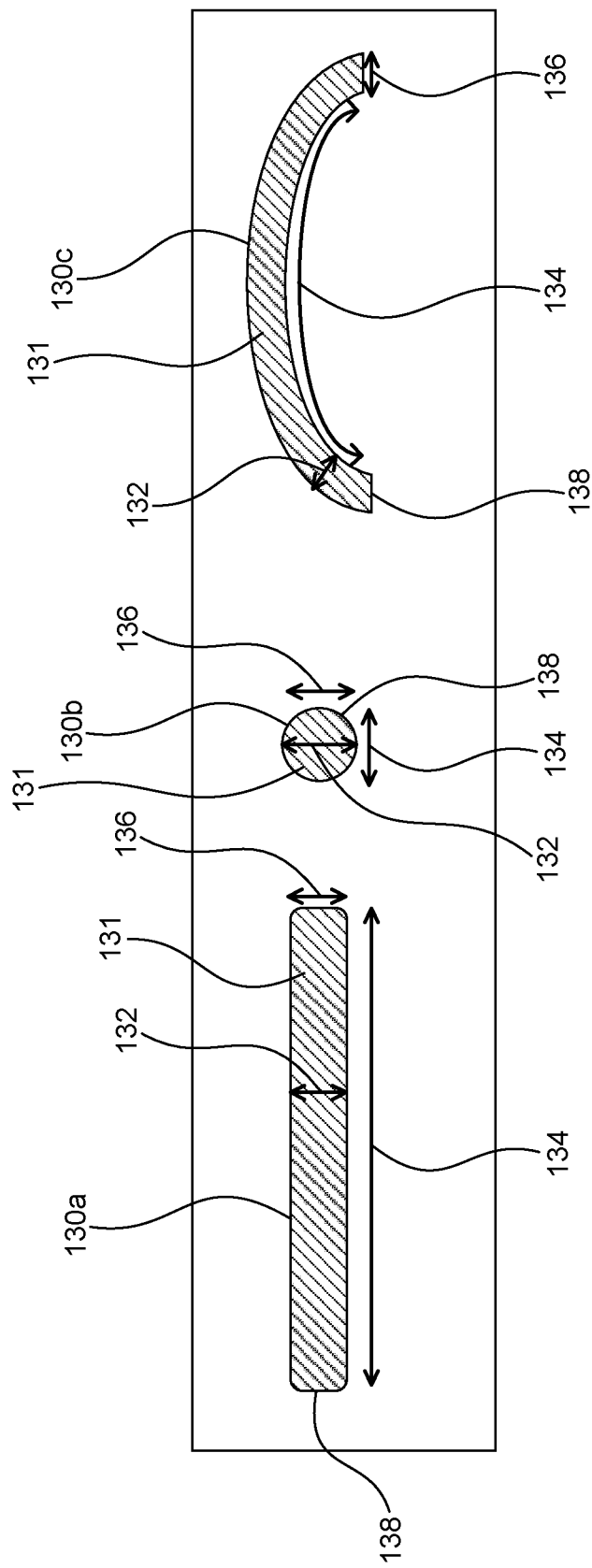
FIG. 3 shows exemplary contact interfaces between a substrate and a 3D printed surface feature according to various embodiments.

As used herein, "minimum contact dimension" means the smallest dimension of an area 131 defining a contact interface 130 between a 3D printed surface feature 120 and the surface of a substrate (e.g., top surface 112 of substrate 110) on which the 3D printed surface is disposed. FIG. 3 illustrates various contact interfaces 130 having various minimum contact dimensions 132 according to some embodiments.

For a contact interface 130a in FIG. 3 having a rectangular interface area 131, the minimum contact dimension 132 of the rectangular interface area 131 is the smaller of the length (i.e., first dimension 134) or the width (i.e., second dimension 136) of the rectangle. For a contact interface 130b having a circular interface area 131, the minimum contact dimension 132 of the circular interface area 131 is the diameter (i.e., first dimension 134 and second dimension 136) of the circular area. For a contact interface 130c having a c-shaped interface area 131, the minimum contact dimension 132 of the c-shaped interface area 131 is the smaller of the length (i.e., first dimension 134) or the width (i.e., second dimension 136) of the c-shaped area. For contact interfaces having an area with a curved shape (e.g., the c-shaped area of contact interface 130c shown in FIG. 3), the length of the interface area 131 is measured along the edge of the interface area and follows the curvature of the interface.

For purposes of calculating a "minimum contact dimension," a representative number of dimension measurements at different cross-sections along the length of a contact interface may be calculated and the smallest value is selected as the "minimum contact dimension." A representative number is at least 2 and, depending on the length of a contact interface, may be more than 2. For a contact interface having a length at least ten times as long at its width, a "minimum contact dimension" is calculated by (i) performing at least 10 dimensional measurements each separated by at least 2% of the contact interface's length and no more than 10% of the contact interface's length and (ii) selecting the smallest value as the "minimum contact dimension." Generally, relatively more representative measurements are needed for relatively longer contact interfaces. Unless necessary due to the size and/or shape of a surface feature, dimension measurements are not performed at a certain distance from the end points 138 of a contact interface to remove any influence due to geometrical changes at the end points, the certain distance being 5% of the contact interface's length. Contact dimensions may be measured by microscopy and image analysis.

In some embodiments, compressive stress region 122 of a 3D printed surface feature 120 may have a compressive stress (CS) in the range of 200 MPa (megapascals) to 1000 MPa, including subranges. For example, compressive stress region 122 of a 3D printed surface feature 120 may have a compressive stress (CS) of 200 MPa, 250 MPa, 300 MPa, 350 MPa, 400 MPa, 450 MPa, 500 MPa, 550 MPa, 600 MPa, 650 MPa, 700 MPa, 750 MPa, 800 MPa, 850 MPa, 900 MPa, 950 MPa, or 1000 MPa, or a compressive stress within a range having any two of these values as endpoints. In some embodiments, compressive stress region 122 of a 3D printed surface feature 120 may have a compressive stress (CS) of 200 MPa or more, 300 MPa or more, 400 MPa or more, 500 MPa or more, 600 MPa or more, 700 MPa or more, 800 MPa or more, or 900 MPa or more.

In some embodiments, central tension region 128 of a 3D printed surface feature 120 may have a central tension (CT) in the range of 20 MPa to 350 MPa, including subranges. For example, central tension region 128 of a 3D printed surface feature 120 may have a central tension (CT) of 20 MPa, 50 MPa, 100 MPa, 150 MPa, 200 MPa, 250 MPa, 300 MPa, 350 MPa, or a central tension within a range having any two of these values as endpoints. In some embodiments, central tension region 128 of a 3D printed surface feature 120 may have a central tension (CT) of 20 MPa or more, 50 MPa or more, 100 MPa or more, 150 MPa or more, 200 MPa or more, 250 MPa or more, or 300 MPa or more. CT may be measured by a scattered light polariscope (SCALP) (such as the SCALP-04 scattered light polariscope available from Glasstress Ltd., located in Tallinn Estonia). A CT value disclosed herein is the maximum tensile stress in central tension region 128.

In some embodiments, depth 126 (and maximum depth 126) of compressive stress region 122 may be in the range of 5 microns (micrometers, µm) to 50 microns, including subranges. For example, depth 126 may be 5 microns, 10 microns, 15 microns, 20 microns, 25 microns, 30 microns, 35 microns, 40 microns, 45 microns, or 50 microns, or a depth within a range having any two of these values as endpoints. In some embodiments, compressive stress region 122 may have a minimum depth 126 of 10 microns or more. In some embodiments, compressive stress region 122 may have a minimum depth 126 of 15 microns or more. In some embodiments, compressive stress region 122 may have a minimum depth 126 of 20 microns or more.

In some embodiments, a 3D printed surface feature 120 may exhibit a stress profile along the depth or thickness thereof that exhibits a parabolic-like shape, for example as described in U.S. Pat. No. 9,593,042, entitled "Glasses and glass ceramics including metal oxide concentration gradient", which is hereby incorporated by reference in its entirety. "Stress profile" refers to the changes in stress from a first point on exterior perimeter surface 124 of the 3D printed surface feature 120 to second point on exterior perimeter surface 124 opposite the first point. The stress profile may be described in terms of MPa at a given micrometer of thickness or depth from exterior perimeter surface. In some embodiments, the stress profile may be substantially free of a flat stress (compressive or tensile) portion or a portion that exhibits a substantially constant stress (compressive or tensile). In some embodiments, the region of a 3D printed surface feature 120 exhibiting a tensile stress has a stress profile that is substantially free of a flat stress or free of a substantially constant stress.

In some embodiments, the stress profile of a compressive stress region 122 may be substantially free of any linear segments that extend in a depth direction. In other words, the stress profile may be substantially continuously increasing or decreasing along the depth 126 of a compressive stress region 122. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within a compressive stress region 122 of about 5 micrometers or greater (e.g., 10 micrometers or greater, or 15 micrometers or greater). For example, along a depth of about 0 micrometers to less than about 5 micrometers from exterior perimeter surface 124, the stress profile may include linear segments, but from a depth of about 5 micrometers or greater from exterior perimeter surface 124, the stress profile may be substantially free of linear segments.

In some embodiments, a parabolic-like stress profile may be generated due to a non-zero concentration of a metal oxide(s) that varies along a portion of a cross-section of a 3D printed surface feature 120. The variation in concentration may be referred to herein as a gradient. In some embodiments, the concentration of a metal oxide is non-zero and varies, both along a depth (t) range from about 0·t to about 0.3·t. In some embodiments, the concentration of the metal oxide is non-zero and varies along a depth range from about 0·t to about 0.35·t, from about 0·t to about 0.4·t, from about 0·t to about 0.45·t or from about 0·t to about 0.48·t. The metal oxide may be described as generating a stress in a 3D printed surface feature 120.

The variation in concentration may be continuous along the above-referenced depth ranges. In some embodiments, the variation in concentration may be continuous along depth segments in the range from about 10 micrometers to about 30 micrometers. In some embodiments, the concentration of the metal oxide decreases from a first point on exterior perimeter surface 124 to a center point between the first point and a second point on exterior perimeter surface 124 opposite the first point, and increases from the center point to the second point.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na– and K– containing bath is used in the ion exchange process, the concentration of K+ ions in a 3D printed surface feature is greater than the concentration of Na+ ions at shallower depths, while the concentration of Na+ is greater than the concentration of K+ ions at deeper depths. This is due, in part, due to the size of the ions. In such a 3D printed surface feature, the area at or near the exterior perimeter surface 124 has a greater CS due to the greater amount of larger ions at or near exterior perimeter surface 124. This greater CS may be exhibited by a stress profile having a steeper slope at or near the exterior perimeter surface 124 (i.e., a spike in the stress profile at the surface).

The concentration gradient or variation of one or more metal oxides is created by chemically strengthening a glass article, for example, by an ion exchange process in which a plurality of first metal ions in the glass substrate is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion. The second metal ion is present in the glass article as an oxide thereof (e.g., $Na_2O$, $K_2O$, $Rb_2O$, $Cs_2O$ or a combination thereof).

In some embodiments, 3D printed surface feature 120 may have a size characterized by a height 129 of 3D printed surface feature 120 measured in a direction orthogonal to contact interface 130. In some embodiments, height 129 may be in the range of 50 microns to 10 millimeters. For example, height 129 may be 50 microns, 100 microns, 200 microns, 300 microns, 400 microns, 500 microns, 600 microns, 700 microns, 800 microns, 900 microns, 1 millimeter, 1.1 millimeters, 1.2 millimeters, 1.3 millimeters, 1.4 millimeters, 1.5 millimeters, 1.6 millimeters, 1.7 millimeters, 1.8 millimeters, 1.9 millimeters, 2 millimeters, 3 millimeters, 4 millimeters, 5 millimeters, 6 millimeters, 7 millimeters, 8 millimeters, 9 millimeters, or 10 millimeters, or within a range having any two of these values as endpoints.

In some embodiments, substrate 110 may be a glass substrate. In some embodiments, substrate 110 may be composed of an ion-exchangeable glass material. In some embodiments, top surface 112 and/or bottom surface 114 of substrate 110 may be composed of an ion-exchangeable glass material. In some embodiments, substrate 110 may be a glass-ceramic substrate. In some embodiments, substrate 110 may be composed of an ion-exchangeable glass-ceramic material. In some embodiments, top surface 112 and/or bottom surface 114 of substrate 110 may be composed of an ion-exchangeable glass-ceramic material.

As used herein the terms "glass substrate" or "glass ceramic substrate" are used in their broadest sense to include any substrate made wholly or partly of a glass or glass-ceramic. Glass substrates include laminates of glass/glass-ceramic and non-glass/glass-ceramic materials, laminates of glass and crystalline materials, and amorphous phase and crystalline phase glass-ceramics. Glass or glass-ceramic substrates may be transparent or opaque. In some embodiments, a glass or glass-ceramic substrate may include a colorant that provides a specific color.

In some embodiments, substrate 110 may be a strengthened substrate including a compressive stress region 118 at top surface 112 and/or bottom surface 114. Compressive stress region(s) 118 may be formed by a process, including but not limited to, a thermal tempering process and/or an ion exchange process. In embodiments utilizing an ion exchange process, substrate 110 is composed in whole or in part of an ion-exchangeable glass material or an ion-exchangeable glass-ceramic material. In some embodiments, compressive stress region 118 at top surface 112 of substrate 110 and compressive stress region 122 at exterior perimeter surface 124 of one or more 3D printed features 120 are portions of a continuous compressive stress region. In such embodiments, compressive stress region 118 and compressive stress region 122 may be formed simultaneously during a strengthening process.

Compressive stress region(s) 118 of substrate 110 may be the same or similar to compressive stress region 122 of a 3D printed surface feature discussed herein. And compressive stress region(s) 118 may be formed in the same manner as discussed herein for a compressive stress region 122. In some embodiments, the DOC of compressive stress region(s) 118 may be described as a fraction of thickness 116 of substrate 110. For example, in some embodiments, the DOC may be equal to or greater than about 50% of thickness 116, equal to or greater than about 10% of thickness 116, equal to or greater than about 11% of thickness 116, equal to or greater than about 12% of thickness 116, equal to or greater than about 13% of thickness 116, equal to or greater than about 14% of thickness 116, equal to or greater than about 15% of thickness 116, equal to or greater than about 16% of thickness 116, equal to or greater than about 17% of thickness 116, equal to or greater than about 18% of thickness 116, equal to or greater than about 19% of thickness 116, equal to or greater than about 20% of thickness 116, equal to or greater than about 21% of thickness 116. In some embodiments, the DOC may be in a range from about 8% to about 25% of thickness 116, from about 9% to about 25% of thickness 116, from about 18% to about 25% of thickness 116, from about 11% to about 25% of thickness 116, from about 12% to about 25% of thickness 116, from about 13% to about 25% of thickness 116, from about 14% to about 25% of thickness 116, from about 15% to about 25% of thickness 116, from about 8% to about 24% of thickness 116, from about 8% to about 23% of thickness 116, from about 8% to about 22% of thickness 116, from about 8% to about 21% of thickness 116, from about 8% to about 20% of thickness 116, from about 8% to about 19% of thickness 116, from about 8% to about 18% of thickness 116, from about 8% to about 17% of thickness 116, from about 8% to about 16% of thickness 116, or from about 8% to about 15% of thickness 116.

In some embodiments, the DOC may be in the range of 20 microns to 300 microns, including subranges. For example, the DOC may be 20 microns, 40 microns, 60 microns, 80 microns, 100 microns, 120 microns, 140 microns, 160 microns 180 microns, 200 microns, 220 microns, 240 microns, 260 microns, 280 microns, or 300 microns, or within a range having any two of these values as endpoints.

In some embodiments, thickness 116 of substrate 110 may be about 1.5 mm (millimeters) or less. For example, thickness 116 may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In some embodiments, substrate 110 may be a curved substrate. A "curved substrate" means a substrate having curved top and bottom surfaces and a curvature profile with a distortion of more than 3 mm per 1 m. In other words, a "curved substrate" has at least a portion that is curved at 3 mm per 1 m or more. A curvature profile is defined on the plane intersecting the mid-point of the thickness measured between the curved top and bottom surfaces of the curved substrate along the length and width of the curved substrate. In some embodiments, a "curved substrate" may be a glass substrate or other substrate that holds a 3D shape as described herein at room temperature (23° C.) and when not being subject to an external force (e.g., a bending force). In some embodiments, a "curved substrate" may be a flexible film that deforms under its own weight at room temperature to form a curved substrate. A "flat substrate" is any substrate that is not curved as defined herein. A "flat substrate" may be a flexible film that is mechanically supported such that it is flat or may be a glass substrate or other substrate that holds a flat shape at room temperature. A glass article with a curved substrate is a curved glass article.

In some embodiments, a curved substrate or glass article may be formed or bent by a hot-forming technique. In some embodiments a curved substrate or glass article may be formed or bent by a cold-bending technique. In some embodiments, a curved substrate or glass article may be curved or bent before one or more 3D printed surface features are disposed thereon. In some embodiments, a curved substrate or glass article may be curved or bent after one or more 3D printed surface features are disposed thereon. In such embodiments, the increased adhesive bond strength between 3D printed surface features and a substrate disclosed herein may facilitate hot-forming a curved glass article. The increased adhesive bond strength provides improved mechanical properties for a glass article with 3D printed surface features such that the article can successfully survive a hot-forming technique.

In some embodiments, substrate 110 may be a cold-bent substrate. As used herein, the terms "cold-bent," or "cold-bending" refer to curving a glass/glass-ceramic substrate at a cold-bend temperature which is less than the softening point of the glass/glass-ceramic. The term "cold-bendable" refers to the capability of a substrate to be cold-bent. A feature of a cold-bent substrate is asymmetric surface compressive stress between top surface 112 and bottom surface 114.

In some embodiments, prior to cold-bending process or being cold-bent, the respective compressive stresses in top surface 112 and bottom surface 114 of substrate 110 are substantially equal. In some embodiments in which substrate 110 is un-strengthened, top surface 112 and bottom surface 114 exhibit no appreciable compressive stress prior to cold-bending. In some embodiments in which substrate 110 is strengthened, top surface 112 and bottom surface 114 exhibit substantially equal compressive stress with respect to one another prior to cold-bending. In some embodiments, after cold-bending, the compressive stress on the surface of a substrate having a concave shape after bending (e.g., top surface 812 in FIG. 8) increases. In other words, the compressive stress on the concave surface (e.g., top surface 812) is greater after cold-bending than before cold-bending. Without being bound by theory, the cold-bending process increases the compressive stress of the substrate being shaped to compensate for tensile stresses imparted during bending and/or forming operations. In some embodiments, the cold-bending process causes the concave surface of a substrate to experience compressive stresses while the surface forming a convex shape (e.g., bottom surface 814 in FIG. 8) after cold-bending experiences tensile stresses. The tensile stress experienced by the convex surface following cold-bending results in a net decrease in surface compressive stress such that the compressive stress in the convex surface following cold-bending is less than the compressive stress on the same surface when the substrate is flat.

When a strengthened substrate 110 is utilized, top surface 112 and bottom surface 114 may have a compressive stress that is substantially equal to one another prior to cold-bending, and thus top surface 112 may experience greater tensile stress during cold-bending without risking fracture. This allows for the strengthened substrate 110 to conform to more tightly curved surfaces or shapes. In some embodiments, thickness 116 of substrate 110 may be tailored to allow substrate 110 to be more flexible to achieve the desired radius of curvature.

In some embodiments, a cold-bent substrate 110 may have a compound curve including a major radius and a cross curvature. A complexly curved cold-bent substrate 110 may have a distinct radius of curvature in two independent directions. According to some embodiments, a complexly curved cold-bent glass substrate 110 may be characterized as having "cross curvature," where the cold-bent substrate 110 is curved along an axis (i.e., a first axis) that is parallel to a given dimension and also curved along an axis (i.e., a second axis) that is perpendicular to the same dimension. The curvature of a cold-bent substrate 110 can be highly complex when a significant minimum radius is combined with a significant cross curvature, and/or depth of bend.

Substrate 110 and 3D printed surface features 120 discussed herein may be formed from various glass or glass-ceramic materials. Suitable glass compositions include soda lime glass, aluminosilicate glass, borosilicate glass, boroaluminosilicate glass, alkali-containing aluminosilicate glass, alkali-containing borosilicate glass, and alkali-containing boroaluminosilicate glass.

A glass-ceramic material is a material produced through controlled crystallization of a glass. In some embodiments, glass-ceramics have about 30% to about 90% crystallinity measured in vol %. Non-limiting examples of glass-ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system). Unless otherwise specified, a glass or glass-ceramic composition is described in mole percent (mol %) as analyzed on an oxide basis.

In some embodiments, a glass or glass-ceramic composition may include $SiO_2$ (silicon oxide) in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In some embodiments, a glass or glass-ceramic composition may include $Al_2O_3$ (aluminum oxide) in an amount greater than about 4 mol %, or greater than about 5 mol %. In some embodiments, a glass or glass-ceramic composition may include $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In some embodiments, the upper limit of $Al_2O_3$ may be about 14 mol %, 14.2 mol %, 14.4 mol %, 14.6 mol %, or 14.8 mol %.

In some embodiments, substrates or 3D printed surface features herein are described as an aluminosilicate substrate or feature. In such embodiments, the glass or glass-ceramic composition includes $SiO_2$ and $Al_2O_3$, and is not a soda lime silicate glass. In this regard, the glass or glass-ceramic composition includes $Al_2O_3$ in an amount of about 2 mol % or greater, 2.25 mol % or greater, 2.5 mol % or greater, about 2.75 mol % or greater, about 3 mol % or greater.

In some embodiments, a glass or glass-ceramic composition may include $B_2O_3$ (boron oxide). In some embodiments, a glass or glass-ceramic composition may include $B_2O_3$ in an amount in a range from about 0.01 mol % to about 5 mol %, from about 0.01 mol % to about 4 mol %, from about 0.01 mol % to about 3 mol %, from about 0.01 mol % to about 2 mol %, from about 0.01 mol % to about 1 mol %, from about 0.01 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In some embodiments, a glass or glass-ceramic composition may be substantially free of $B_2O_3$. As used herein, the phrase "substantially free" with respect to the components of the composition means that the component is not actively or intentionally added to the composition during initial batching, but may be present as an impurity in an amount less than about 0.001 mol %.

In some embodiments, a glass or glass-ceramic composition may include $P_2O_5$ (phosphorous oxide). In some embodiments, a glass or glass-ceramic composition may include at least 0.01 mol % $P_2O_5$ and up to and including 2 mol %, 1.5 mol %, 1 mol %, or 0.5 mol % $P_2O_5$. In some embodiments, a glass or glass-ceramic composition may be substantially free of $P_2O_5$.

In some embodiments, a glass or glass-ceramic composition may include a total amount of $R_2O$ (which is the total amount of alkali metal oxide such as $Li_2O$ (lithium oxide), $Na_2O$ (sodium oxide), $K_2O$ (potassium), $Rb_2O$ (rubidium oxide), and $Cs_2O$ (caesium oxide)) that is greater than or equal to about 8 mol %, greater than or equal to about 10 mol %, or greater than or equal to about 12 mol %. In some embodiments, a glass or glass-ceramic composition may include a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 13 mol %, and all ranges and sub-ranges therebetween. In some embodiments, a glass or glass-ceramic composition may be substantially free of $Rb_2O$, $Cs_2O$, or both $Rb_2O$ and $Cs_2O$. In some embodiments, the total amount of $R_2O$ may include the total amount of $Li_2O$, $Na_2O$, and $K_2O$ only. In some embodiments, a glass or glass-ceramic composition may comprise at least one alkali metal oxide selected from $Li_2O$, $Na_2O$ and $K_2O$, wherein the alkali metal oxide is present in an amount greater than about 8 mol % or greater.

In some embodiments, a glass or glass-ceramic composition may include $Na_2O$ in an amount greater than or equal to about 8 mol %, greater than or equal to about 10 mol %, or greater than or equal to about 12 mol %. In some embodiments, a glass or glass-ceramic composition may include $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 16 mol %, and all ranges and sub-ranges therebetween.

In some embodiments, a glass or glass-ceramic composition may include less than about 4 mol % $K_2O$, less than about 3 mol % $K_2O$, or less than about 1 mol % $K_2O$. In some embodiments, a glass or glass-ceramic composition may include $K_2O$ in an amount in a range from about 0.01 mol % to about 4 mol %, from about 0.01 mol % to about 3.5 mol %, from about 0.01 mol % to about 3 mol %, from about 0.01 mol % to about 2.5 mol %, from about 0.01 mol % to about 2 mol %, from about 0.01 mol % to about 1.5 mol %, from about 0.01 mol % to about 1 mol %, from about 0.01 mol % to about 0.5 mol %, from about 0.01 mol % to about 0.2 mol %, from about 0.01 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In some embodiments, a glass or glass-ceramic composition may be substantially free of $K_2O$.

In some embodiments, a glass or glass-ceramic composition may be substantially free of $Li_2O$. In some embodiments, the amount of $Na_2O$ in a composition may be greater than the amount of $Li_2O$. In some embodiments, the amount of $Na_2O$ may be greater than the combined amount of $Li_2O$ and $K_2O$ in a composition. In some embodiments, the amount of $Li_2O$ in a composition may be greater than the amount of $Na_2O$ or the combined amount of $Na_2O$ and $K_2O$.

In some embodiments, a glass or glass-ceramic composition may include a total amount of RO (which is the total amount of alkaline earth metal oxide such as CaO (calcium oxide), MgO (magnesium oxide), BaO (barium oxide), ZnO (zinc oxide) and SrO (strontium oxide)) in a range from about 0.01 mol % to about 2 mol %. In some embodiments, a glass or glass-ceramic composition may include RO in an amount from about 0.01 mol % to about 1.8 mol %, from about 0.01 mol % to about 1.6 mol %, from about 0.01 mol % to about 1.5 mol %, from about 0.01 mol % to about 1.4 mol %, from about 0.01 mol % to about 1.2 mol %, from about 0.01 mol % to about 1 mol %, from about 0.01 mol % to about 0.8 mol %, from about 0.01 mol % to about 0.5 mol %, and all ranges and sub-ranges therebetween.

In some embodiments, a glass or glass-ceramic composition may include CaO in an amount of at least 0.01 mol % and less than about 1 mol %, less than about 0.8 mol %, or less than about 0.5 mol %. In some embodiments, a glass or glass-ceramic composition may be substantially free of CaO.

In some embodiments, a glass or glass-ceramic composition may include MgO in an amount from about 0.01 mol % to about 7 mol %, from about 0.01 mol % to about 6 mol %, from about 0.01 mol % to about 5 mol %, from about 0.01 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In some embodiments, a glass or glass ceramic composition may include $ZrO_2$ in an amount of at least 0.01 mol % and equal to or less than about 0.2 mol %, less than about 0.18 mol %, less than about 0.16 mol %, less than about 0.15 mol %, less than about 0.14 mol %, or less than about 0.12 mol %. In some embodiments, a glass or glass-ceramic composition may include $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In some embodiments, a glass or glass-ceramic composition may include $SnO_2$ (tin oxide) in an amount of at least 0.01 mol % and equal to or less than about 0.2 mol %, less than about 0.18 mol %, less than about 0.16 mol %, less than about 0.15 mol %, less than about 0.14 mol %, or less than about 0.12 mol %. In some embodiments, a glass or glass-ceramic composition may include $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In some embodiments, a glass or glass-ceramic composition may include an oxide that imparts a color or tint to a substrate or 3D printed surface feature. In some embodiments, a glass or glass-ceramic composition includes an oxide that prevents discoloration of a substrate or 3D printed surface feature when the substrate or 3D printed surface feature is exposed to ultraviolet radiation. Examples of such oxides include, without limitation, oxides of: Ti (titanium), V (vanadium), Cr (chromium), Mn (magnesium), Fe (iron), Co (cobalt), Ni (nickel), Cu (copper), Ce (cerium), W (tungsten), and Mo (molybdenum). Glass or glass-ceramic compositions that include an oxide that imparts a color create a colored glass or colored glass-ceramic.

In some embodiments, a glass or glass-ceramic composition may include Fe (iron) expressed as $Fe_2O_3$ (iron oxide), wherein Fe is present in an amount up to (and including) about 1 mol %. In some embodiments, a glass or glass-ceramic composition may be substantially free of Fe. In some embodiments, a glass or glass-ceramic composition may include $Fe_2O_3$ in an amount of at least 0.01 mol % and equal to or less than about 0.2 mol %, less than about 0.18 mol %, less than about 0.16 mol %, less than about 0.15 mol %, less than about 0.14 mol %, or less than about 0.12 mol %. In some embodiments, a glass or glass-ceramic composition may include $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In some embodiments, a glass or glass-ceramic composition may include $TiO_2$ (titanium oxide) in an amount of at least 0.01 mol % and about 5 mol % or less, about 2.5 mol % or less, about 2 mol % or less, or about 1 mol % or less. In some embodiments, a glass or glass-ceramic composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

In some embodiments, glass article 100 may include a coating layer 150. In some embodiments, coating layer 150 may be disposed on one or more 3D printed surface features 120 of glass article 100 (i.e., coating layer 150 may be disposed on exterior perimeter surface(s) 124 of 3D printed surface feature(s) 120). In some embodiments, coating layer 150 may be disposed over one or more 3D printed surface features 120 of article 100 (i.e., coating layer 150 may be disposed over exterior perimeter surface(s) 124 of 3D printed surface feature(s) 120). In some embodiments, coating layer 150 may be disposed on top surface 112 of substrate 110. In some embodiments, coating layer 150 may be disposed over top surface 112 of substrate 110. In some embodiments, coating layer 150 may be disposed on bottom surface 114 of substrate 110. In some embodiments, coating layer 150 may be disposed over bottom surface 114 of substrate 110.

As used herein, "disposed on" means that a first layer/component is in direct contact with a second layer/component. A first layer/component "disposed on" a second layer/component may be deposited, formed, placed, or otherwise applied directly onto the second layer/component. In other words, if a first layer/component is disposed on a second layer/component, there are no layers disposed between the first layer/component and the second layer/component. If a first layer/component is described as "disposed over" a second layer/component, other layers may or may not be present between the first layer/component and the second layer/component.

Coating layer 150 may cover all or a portion of a 3D printed surface feature 120, top surface 112, and/or bottom surface 114 of substrate 110. In some embodiments, coating layer 150 may be defined by a portion of a surface of substrate 110 (e.g., top surface 112 or bottom surface 114) that has been treated to exhibit a desired quality. In such embodiments, coating layer 150 is surface treatment layer. Exemplary coating layers include an easy-to-clean coating layer, an anti-glare layer or surface, an anti-reflective layer or surface, a haptic coating layer or surface, a decorative layer, or an anti-microbial/viral layer formed on or disposed over a surface of article 100.

An anti-reflective surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about ±2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety.

An anti-reflective coating layer may be formed by a multi-layer coating stack formed from alternating layers of a high refractive index material and a low refractive index material. Such coatings stacks may include six layers or more. In some embodiments, an anti-reflective coating layer may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

A decorative coating layer may include any aesthetic design formed from a pigment (e.g., ink, paint, and the like) and may, for example, include a single color, a wood-grain design, a brushed metal design, a graphic design, a portrait, or a logo.

In some embodiments, an anti-glare surface includes an etched surface. An anti-glare coating layer may be a single layer or multi-layer coating. Suitable anti-glare layers include, but are not limited to, the anti-glare layers prepared by the processes described in U.S. Pat. Pub. Nos. 2010/0246016, 2011/0062849, 2011/0267697, 2011/0267698, 2015/0198752, and 2012/0281292, all of which are hereby incorporated by reference in their entirety by reference thereto.

In some embodiments, an easy-to-clean coating layer includes an oleophobic coating that imparts anti-fingerprint properties. In some embodiments, the easy-to-clean coating layer may include a material selected from the group consisting of fluoroalkylsilanes, perfluoropolyether alkoxy silanes, perfluoroalkyl alkoxy silanes, fluoroalkylsilane-(non-fluoroalkylsilane) copolymers, and mixtures of fluoroalkylsilanes.

In some embodiments, a haptic coating layer may include a raised or recessed surface formed from depositing a polymer or glass material on a surface of a substrate 110 or a 3D printed surface feature 120 to provide a user with tactile feedback when touched. In some embodiments, a haptic surface may be an etched surface that provides a user with tactile feedback when touched.

Suitable anti-microbial/viral layers include, but are not limited to, an antimicrobial Ag+ region extending from the surface of a glass to a depth in the glass having a suitable concentration of Ag+1 ions on the surface of the glass, as described in, for example, U.S. Pat. App. Pub. No. 2012/0034435, published Feb. 9, 2012, and U.S. Pat. App. Pub. No. 2015/0118276, published Apr. 30, 2015. The contents of U.S. Pat. App. Pub. No. 2012/0034435 and U.S. Pat. App. Pub. No. 2015/0118276 are incorporated herein by reference in their entirety.

In some embodiments, article 100 may include a color layer 160. In some embodiments, color layer 160 may be disposed on one or more 3D printed surface features 120 of article 100 (i.e., color layer 160 may be disposed on exterior perimeter surface(s) 124 of 3D printed surface feature(s) 120). In some embodiments, color layer 160 may be disposed over one or more 3D printed surface features 120 of article 100 (i.e., coating layer 150 may be disposed over exterior perimeter surface(s) 124 of 3D printed surface feature(s) 120). In some embodiments, color layer 160 may be disposed on top surface 112 of substrate 110. In some embodiments, color layer 160 may be disposed over top surface 112 of substrate 110. In some embodiments, color layer 160 may be disposed on bottom surface 114 of substrate 110. In some embodiments, color layer 160 may be disposed over bottom surface 114 of substrate 110. Disposing color layer 160 on or over bottom surface 114 can protect color layer from damage (e.g., scratches).

Color layer 160 may cover all or a portion of a 3D printed surface feature 120, top surface 112, and/or bottom surface 114 of glass article 100. Color layer 160 may be, for example, an ink, a paint, or an ITO (indium tin oxide) layer. In some embodiments, a color layer 160 may exhibit a deadfront effect in which the decorative surface disguises or masks an underlying display module from a viewer when the display is turned off but permits the display to be viewed when the display is turned on.

In some embodiments, the cross-sectional size or shapes of a contiguous preformed material feedstock may be tailored to create a 3D printed surface feature having a desired size and/or shape to optimize the contact interface between a 3D printed surface feature and a substrate, and/or to optimize a contact angle ($\theta$) between a 3D printed surface feature and a substrate. The contact angle ($\theta$) may be any value less than 180 degrees. In some embodiments, the contact angle ($\theta$) may be less than 135 degrees. In some embodiments, the contact angle ($\theta$) may be less than 90 degrees. In some embodiments, the contact angle ($\theta$) may in the range of 5 degrees to 179 degrees, including subranges. For example, the contact angle ($\theta$) may be 5 degrees, 10 degrees, 20 degrees, 30 degrees, 40 degrees, 45 degrees, 50 degrees, 60 degrees, 70 degrees, 75 degrees, 80 degrees, 90 degrees, 100 degrees, 110 degrees, 120 degrees, 130 degrees, 135 degrees, 140 degrees, 150 degrees, 160 degrees, 170 degrees, or 179 degrees, or within a range having any two of these values as endpoints.

Figure 4:
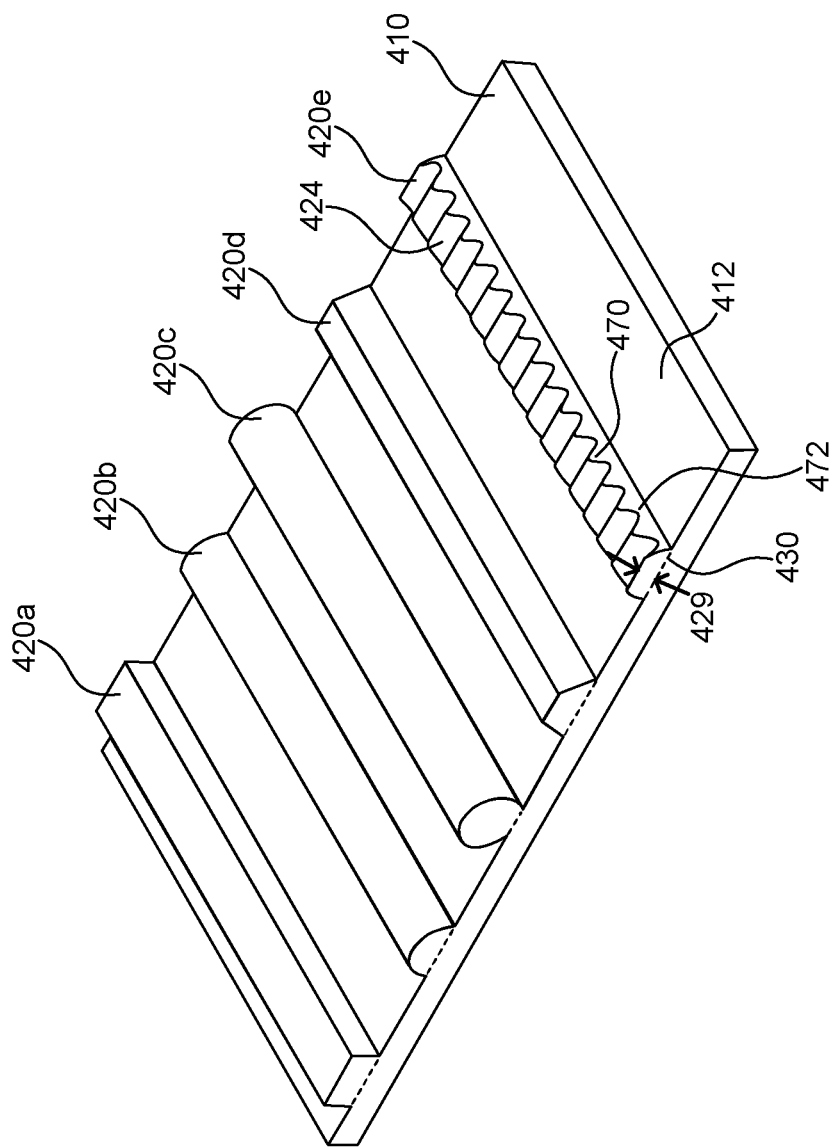
FIG. 4 shows exemplary 3D printed surface features according to various embodiments.

FIG. 4 illustrates some 3D printed surface features 420a-e printed on a surface 412 of a substrate 410 and having exemplary shapes according to some embodiments. 3D printed surface feature 420a has a rectangular shape. 3D printed surface feature 420b has a hemispherical shape. 3D printed surface feature 420c has a generally circular shape. 3D printed surface feature 420d has a polygonal shape.

In some embodiments, a 3D printed surface feature may be printed such that the surface feature incudes a textured surface. In some embodiments, a textured surface may be created by (i) pulsing a stage speed (e.g., speed of XY stage 1124 in FIG. 11) (ii) pulsating a down feed of a contiguous preformed material during printing (e.g., feeding contiguous preformed material 1106 at various speeds using feed system 1101 shown in FIG. 11), (iii) varying the viscosity a contiguous preformed material in a build zone (e.g., build zone 1104) during printing, (iv) machining or forming a contiguous preformed material to desired shape prior to printing, or (v) a combination of one or more of (i)-(iv).

FIG. 4 illustrates a 3D printed surface feature 420e with a textured exterior perimeter surface 424 according to some embodiments. 3D printed surface feature 420e has a cross-sectional shape that varies along the length of 3D printed surface feature 420e. In particular, the height 429, measured from contact interface 430 to the highest most point on exterior surface 424 of 3D printed surface feature 420e, varies along the length of 3D printed surface feature 420e. This variation in height creates a textured exterior perimeter surface 424 defined by a plurality of peaks 470 and recesses 472. Height 429 may vary within any of the ranges described herein for height 129.

Figure 5:
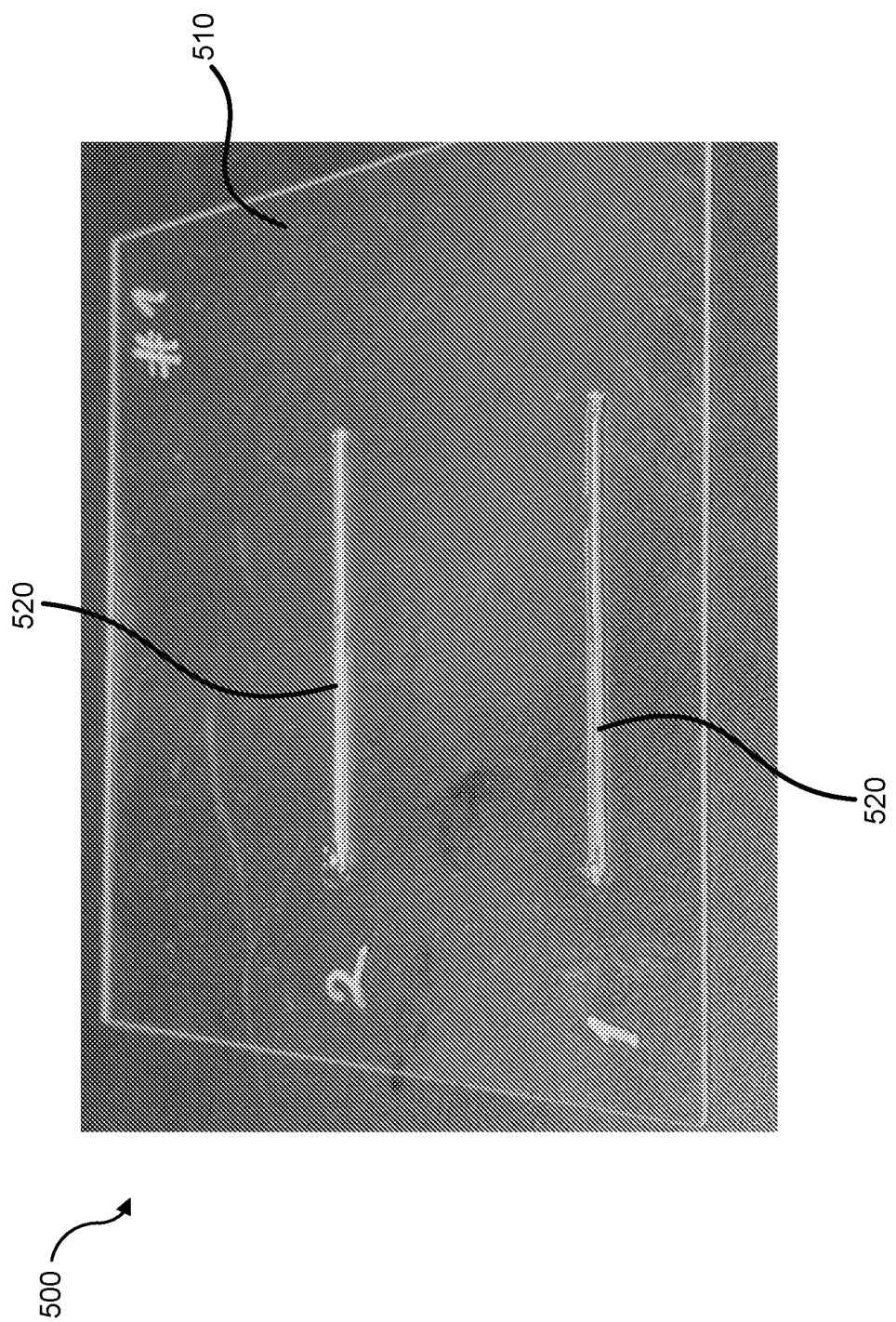
FIG. 5 is a photograph of a test sample with two 3D printed surface features.
Figure 6:
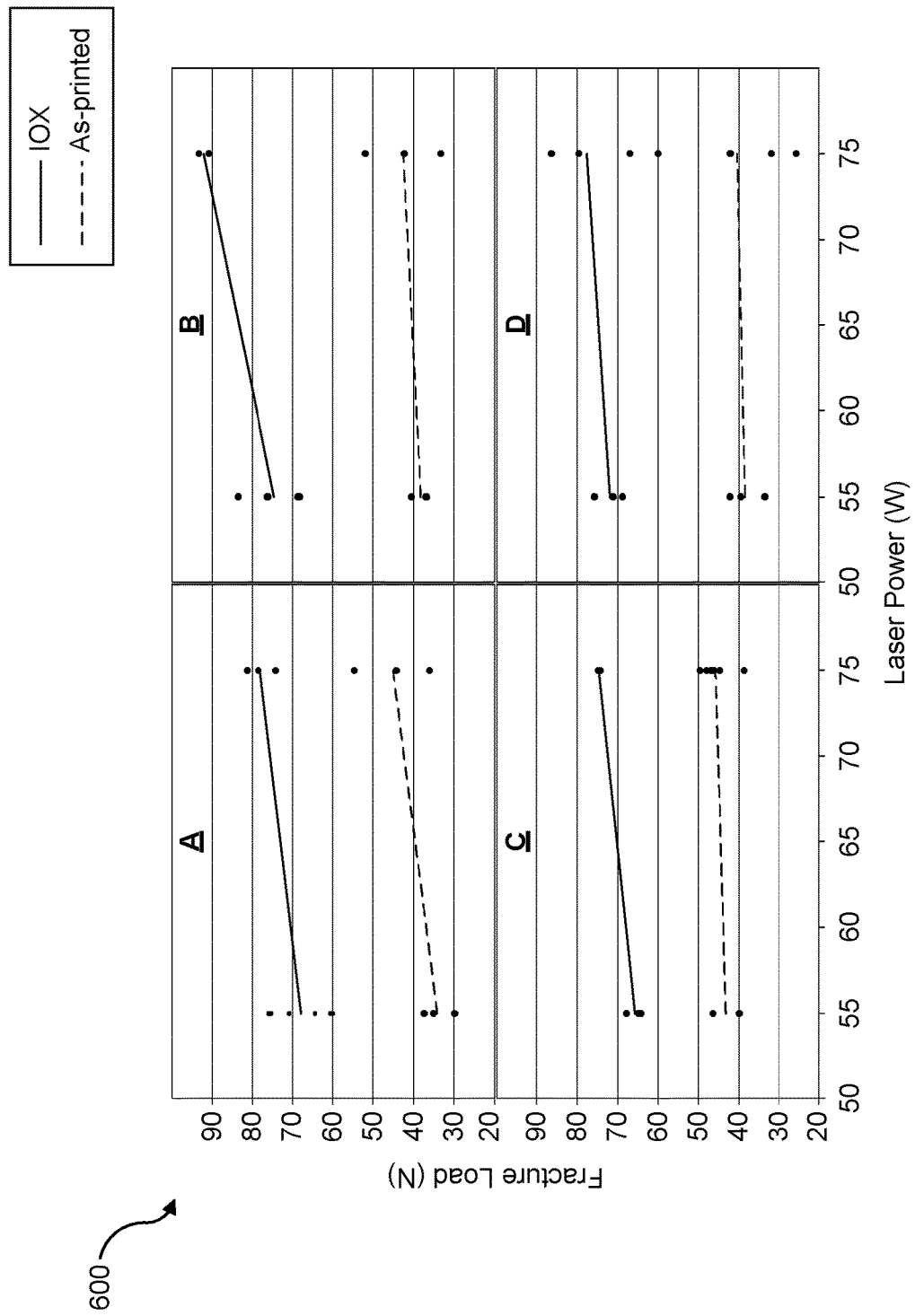
FIG. 6 is a graph of the facture load for 3D printed surface features versus laser power for various test samples.

Experimental testing was performed to evaluate the adhesive bond strength (ABS) between 3D printed surface features and substrates according to embodiments discussed herein. FIG. 5 illustrates a test sample 500 and FIG. 6 is a graph 600 showing the results of the testing.

For the testing, each sample 500 included a glass substrate 510 and 3D printed surface features 520 printed from a contiguous preformed material using system 1100 described herein. Both the substrates 510 and the 3D printed surface features 520 were composed of a glass having the following composition: about 67 mol % $SiO_2$, about 4 mol % $B_2O_3$, about 13 mol % $Al_2O_3$, about 14 mol % $NaO_2$, about 2 mol % MgO, about 0.10 mol % $SnO_2$, about 0.01 mol % $K_2O$, and about 0.01 mol % $Fe_2O_3$. The contiguous preformed material used to 3D print surface features 520 was a 1 mm diameter glass rod. And the glass rod was printed on substrates 510 with thicknesses of 0.7 and 1.1 mm. The laser power applied to hot spot 1126 during 3D printing of surface features 520 was either 55 W or 75 W (watts). Each substrate 510 was preheated to 1150° F. (620° C.) prior to 3D printing, and then annealed in a furnace at 1150° F. (620° C.) after 3D printing of features on each respective substrate 510. Annealing was followed by overnight cooling inside the furnace.

Two 2D printed surface features 520 were printed on each substrate 510 tested. Each 3D printed surface feature 520 was printed to a length of 50 mm on a substrate 510. The feed rate of the 1 mm diameter glass rods into hot spot 1126 was 3.5 mm/s (millimeters per second).

After annealing, half of the samples 500 were ion exchanged under the following conditions: (a) 420° C. for 4 hours, salt bath composition: (b) 5 wt % $NaNO_3$+95 wt % $KNO_3$, (c) 0.5 wt % silicic acid was added to avoid glass etching. After ion-exchanging the samples, they were rinsed with DI water.

Then all of the ion-exchanged samples 500 and all of the non-ion-exchanged samples 500 (referred to as "as-printed" samples) were tested for ABS as follows. A circular loading pin (0.325 inch diameter) was pushed against each 3D printed surface feature 520 until fracture. At a minimum, two separate areas of each 3D printed surface feature 520 were fractured. These areas were significantly far apart that a prior fracture would not influence the bond strength of a subsequent area tested. The feed rate of samples 500 toward the loading pin was 2 mm/min (millimeters per minute). The loading pin applied a force to 3D printed surface features 520 in a direction parallel to the surface of the substrate 510 on which surface features 520 were printed. The applied normal load of the loading pin was 0.1 N (newtons). The measured load applied to surface features 520 was recorded as a function of time.

Table 1 below summarizes the sample conditions in terms of substrate thickness, laser power, and conditions used.

TABLE 1

| Sample No. | Plate Thickness (mm) | Laser Power (W) | Condition |
|---|---|---|---|
| 1 | 0.7 | 55 | IOX |
| 2 | 0.7 | 55 | As-printed |
| 3 | 0.7 | 75 | IOX |
| 4 | 0.7 | 75 | As-printed |
| 5 | 1.1 | 55 | IOX |
| 6 | 1.1 | 55 | As-printed |
| 7 | 1.1 | 75 | IOX |
| 8 | 1.1 | 75 | As-printed |

Graph 600 shows the raw data for separation (fracture) load for each sample 500 tested. Quadrants A and B of graph 600 show test data for substrates 510 having a thickness of 0.7 mm. Quadrants C and D of graph 600 show test data for substrates 510 having a thickness of 1.1 mm. As evident in graph 600, ion-exchanging samples 500 increased the average separation load by 80%, from an average fracture load of 41±8 N in the as-printed condition (28 data points) to 74±8 N in the ion-exchanged (IOX) condition (28 data points).

To confirm that ion-exchanging is the process condition that most impacts the ABS of samples 500, statistical analysis using JMP software (Fit Model Least Squares at alpha Confidence Level of 0.05) was performed. Table 2 below shows the results of this analysis. The P-values in Table 2 confirm the significant impact of ion-exchanging compared to other factors. The lower the P-value (Probability Value), the larger the impact of a given term. P-values above 0.05 are insignificant. Laser power is the second most significant factor. Position of printed line and plate thickness are insignificant factors.

TABLE 2

| Term | P-value |
|---|---|
| Condition [As-printed] | <0.0001 |
| Laser Power (W) | 0.0002 |
| Condition[As-Printed]*Printed Line | 0.0178 |
| Printed Line | 0.2213 |
| Plate Thickness (mm) | 0.3788 |

Another distinguishing impact of ion-exchanging samples 500 was at the fracture surface were 3D printed surface features 520 fractured off of substrates 510. The surface topography of the fracture surfaces of ion-exchanged samples and as-printed samples was different. For as-printed samples, the fracture surface exhibited directional cracking in the direction of the force applied by the load pin. For ion-exchanged samples, the fracture surface exhibited multi-faceted cracking. This difference in fracture surface topography is believed to be the result of compressive stress regions created by ion-exchanging the samples.

To further investigate the impact of ion-exchanging 3D printed surface features disposed on a surface of a substrate, the salt bath chemistry and processing time of the ion-exchange process were altered to change the DOC of a compressive stress region in a 3D printed surface feature (e.g., depth 126 of compressive stress region 122). The ion-exchange conditions for this second ion-exchange process were as follows: (a) 420° C. for 8 hours, (b) salt bath composition: 100 wt % $KNO_3$, (c) 0.5 wt % silicic acid was added to avoid glass etching After ion-exchanging the samples, they were rinsed with DI water.

The 3D printed surface features ion-exchanged with this second ion-exchange process were printed on a 0.7 mm substrate using system 1100 with the same 1 mm diameter glass rod as samples 500. The laser power applied to hot spot 1126 during 3D printing of these features was 65 W. Similar to samples 500, each substrate was preheated prior to 3D printing, and then annealed in a furnace after 3D printing of surface features. Annealing was followed by overnight cooling inside the furnace.

The 3D printed surface features ion-exchanged with this second ion-exchange process were characterized for ABS using the same test methodology as described above for samples 500. The ABS test results showed that the fracture load was increased to 91±13 N (23% increase from 74±8 N obtained with the ion-exchange process conditions used for samples 500). This indicates an overall increase in ABS of 122% compared to that of as-printed samples (41±8 N).

Accordingly, ion-exchanging 3D printed surface features to include compressive stress regions as disclosed herein improves the adhesive bond strength between the 3D printed surface features and a substrate. This improved adhesive bond strength helps prevent undesirable fracture of the 3D printed surface features and extends the lifetime of glass articles including 3D printed surface features disclosed herein. Such improvements facilitate the use of these glass articles in various applications.

Figure 7:
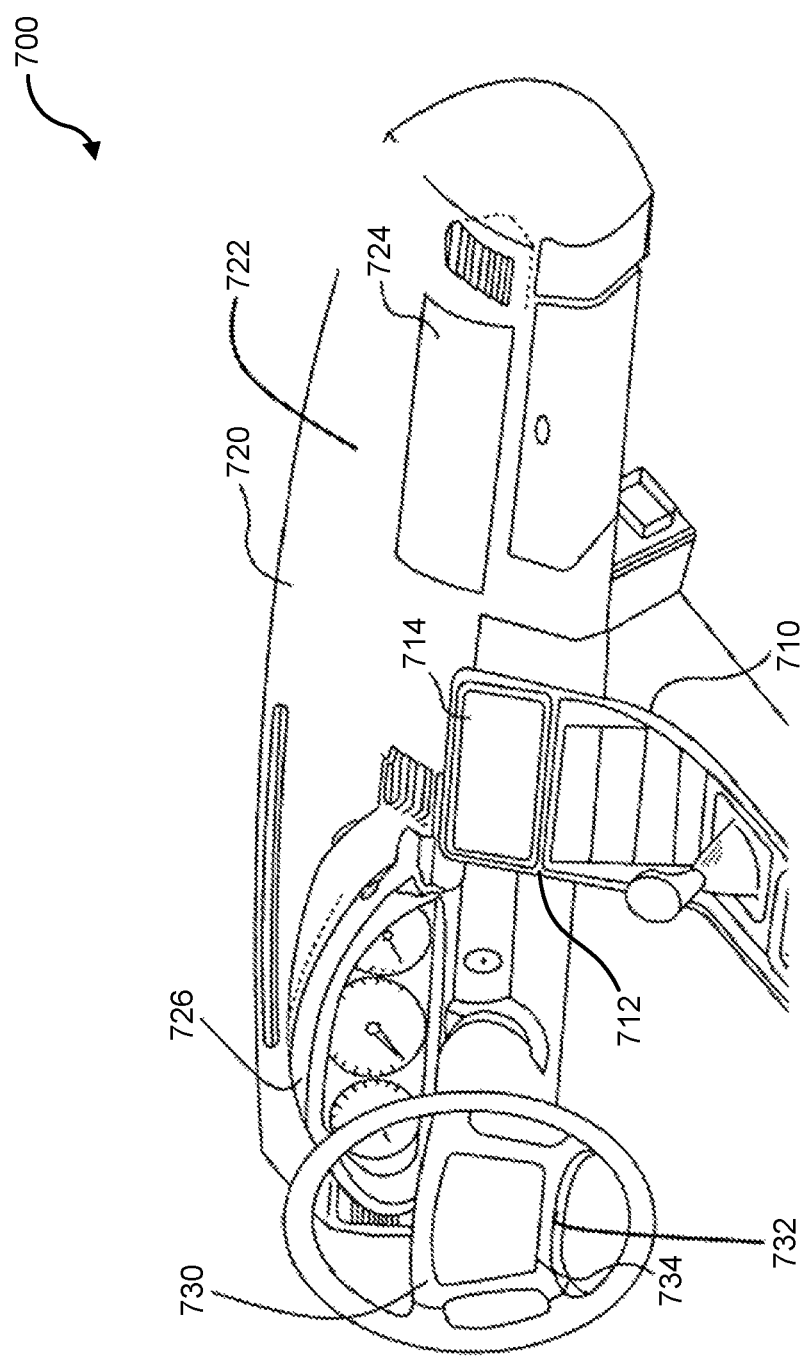
FIG. 7 shows a perspective view of a vehicle interior according to some embodiments.

FIG. 7 shows a vehicle interior 700 according to some embodiments. Vehicle interior 700 includes a center console base 710, a dashboard base 720, and a steering wheel base 730. Center console base 710 includes a display 714 mounted on a flat or curved surface 712. Display 714 may be a flat or curved display. Dashboard base 720 includes a display 724 mounted on a flat or curved surface 722. Display 724 may be a flat or curved display. In some embodiments, dashboard base 720 may include an instrument panel 726, which may also include a flat or curved display. Steering wheel base 730 includes a display 734 mounted to a flat or curved surface 732. Display 734 may be a flat or curved display. In some embodiments, vehicle interior 700 may include additional bases, such as an arm rest, a pillar, a seat back, a floor board, a headrest, or a door panel. Each of these bases may include a flat or curved surface including a display, which may be flat or curved. Displays of vehicle interior 700 may be any display discussed herein. And glass articles discussed herein may be utilized as substrates for such displays.

While FIG. 7 illustrates vehicle interior 700 as an automobile interior, vehicle interior 700 may be an interior for any type of vehicle, such as a train, a sea craft (boats, ships, submarines, and the like), and an aircraft (e.g., drones, airplanes, jets, helicopters and the like), including both human-piloted vehicles, semi-autonomous vehicles and fully autonomous vehicles. Further, while the description herein relates primarily to the use of the disclosed glass articles used for a vehicle display, it should be understood that various embodiments discussed herein may be used in any type of display application. For example, glass articles discussed herein may be incorporated into an article with a display (or display articles) (e.g., consumer electronic products, including mobile phones, tablets, computers, navigation systems, wearable devices (e.g., watches and the like)), architectural articles (e.g., a window or window assembly), or appliance articles (e.g., refrigerators or ranges).

Figure 8:
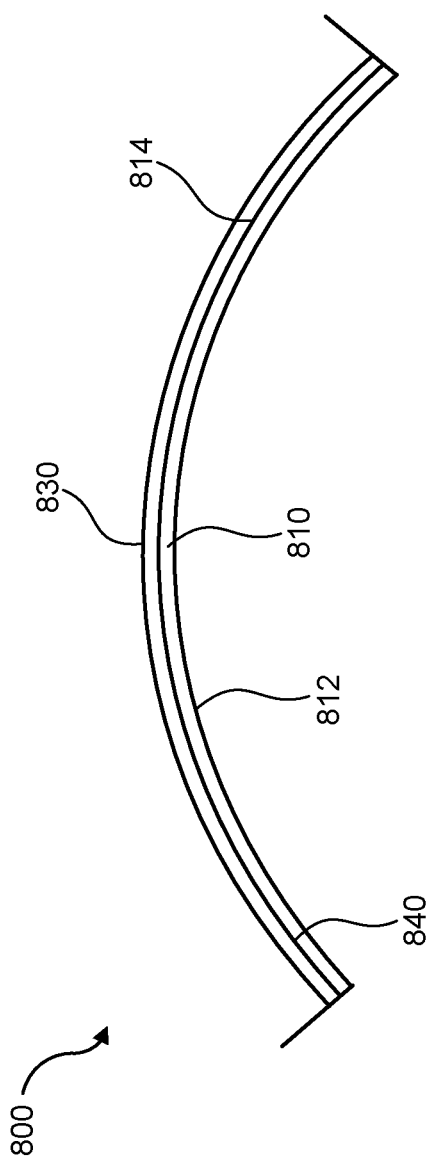
FIG. 8 shows a display including a substrate and a display module according to some embodiments.

FIG. 8 illustrates a display 800 including a substrate 810 and a display module 830 according to some embodiments. Substrate 810 may be the same as or similar to substrate 110. Substrate 810 may be disposed on a top, user-facing surface of display module 830. In such embodiments, substrate 810 may be a cover glass substrate. As used herein, the terms "top surface" or "topmost surface," and "bottom surface" or "bottommost surface" reference the top and bottom surface of a layer, component, or article as is would be oriented during its normal and intended use with the top surface being the user-facing surface. For example, when incorporated into a product having an electronic display, the "top surface" of an article, layer, or component refers to the top surface of that article, layer, or component as it would be oriented when the electronic display is being viewed through the article, component, or layer.

Display module 830 is disposed over a bottom surface 814 of substrate 810. In some embodiments, display module 830 may be disposed on bottom surface 814 of substrate 810. In some embodiments, display module 830 may be bonded to bottom surface 814 of substrate 810 with an adhesive. In some embodiments, display module 830 may include touch functionality and such functionality is accessible through substrate 810. Displayed images or content shown on display module 830 may be visible through substrate 810.

In some embodiments, display 800 includes an adhesive layer 840 between substrate 810 and display module 830. Adhesive layer 840 may be optically transparent. In some embodiments, adhesive layer 840 may be disposed on a portion of substrate 810 and/or display module 830. The thickness of adhesive layer 840 may be tailored to ensure lamination between display module 830 and substrate 810. For example, adhesive layer 840 may have a thickness of about 1 mm or less. In some embodiments, adhesive layer 840 may have a thickness in the range of 200 microns (micrometers, μm) to 500 microns, including subranges. For example, adhesive layer 840 may have a thickness of 500 microns, 475 microns, 450 microns, 425 microns, 400 microns, 375 microns, 350 microns, 325 microns, 300 microns, 250 microns, 225 microns, or 200 microns, or within a range having any two of these values as endpoints.

In some embodiments, display module 830 may include an electronic display, such as but not limited to a light-emitting diode (LED) display, an organic light-emitting diode (OLED) display, or a liquid crystal display. In some embodiments, display module 830 may be a non-electronic display device. For example, display module 830 may be a display device that displays static or printed indicia. In some embodiments, display module 830 may include a touch screen, such as a capacitive touch screen.

In some embodiments, display module 830 may include a deadfront display. A deadfront display includes a surface that exhibits a deadfront effect in which the surface disguises or masks underlying display features (e.g., graphic and/or icon) from a viewer when the display is not backlit, but permits the display features to be viewed when the article is backlit. The deadfront effect of a deadfront display can be used to match the color or pattern of the display to adjacent components to eliminate the visibility of transitions from the deadfront display to the surrounding components. This can be especially useful when the deadfront display is a different material from the surrounding components (e.g., the deadfront display is formed from a glass material but surrounded by a leather-covered center console). For example, a deadfront display may have a wood grain pattern or a leather pattern that can be used to match the appearance of the display with surrounding wood or leather components of a vehicle interior system (e.g., a wood or leather dashboard) in which the display is mounted.

Display module 830 is configured to display a graphic (e.g., graphic 920 or graphic 1020) that may be viewed through a top surface 812 of substrate 810. In some embodiments, substrate 810 may include one or more 3D printed surface feature disposed on top surface 812 of substrate 810 in a complimentary fashion to a graphic displayed by display module 830. In some embodiments, a graphic displayed by display module may be or may include an icon.

As used herein, an "icon" is an area, line, shape, pattern, design, image, symbol, letter, number, logo, or combination thereof that represents one or more functionalities of a device. When actuated by a user (e.g., via touch) an icon will produce a functional result represented by the icon. For example, an on/off icon will power a device on or off. As another example, a "volume" icon will cause a device to produce more or less sound. An icon may also be called a button.

As used herein, two objects disposed or positioned in a "complimentary fashion" means that the two objects have substantially the same overall shape, perimeter shape, design, and/or pattern, and occupy substantially the same relative surface area on opposing surfaces of a substrate. In embodiments including an object formed within a substrate (e.g., a graphic disposed within a substrate), the overall shape, perimeter shape, design, and/or pattern, and the relative surface area of such an object is the overall shape, perimeter shape, design, and/or pattern, and surface area of that object projected onto a surface of the substrate opposite the surface on which the corresponding object is disposed or positioned in a complimentary fashion.

Figure 9:
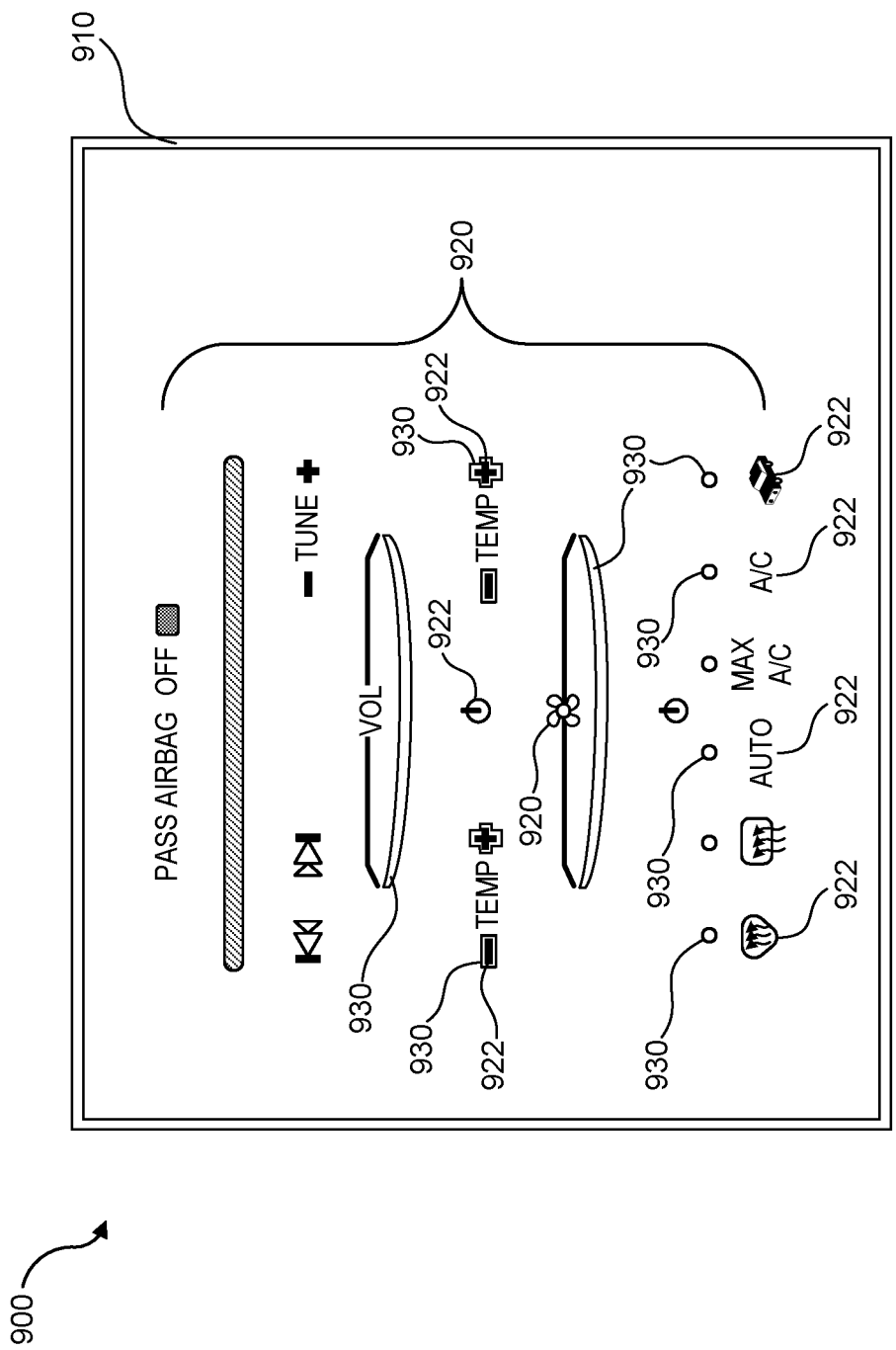
FIG. 9 shows a display according to some embodiments.

FIG. 9 illustrates a display 900 according to some embodiments. Display 900 is configured to display a graphic 920 through a substrate 910. Graphic 920 includes a plurality of icons 922. The icons 922 of graphic 920 include, among others, on/off icons, air temperature icons, volume icons, a fan speed icon, and various A/C icons.

A substrate 910 of display 900 includes a plurality of 3D printed surface features 930. Substrate 910 may be the same as or similar to any substrate (e.g., substrate 110) discussed herein. In some embodiments, one or more 3D printed surface features 930 may be disposed on a top surface of substrate 910 in a complimentary fashion to icons 922 displayed through substrate 910. For example, substrate 910 includes "−" and "+"-shaped 3D printed surface features 930 disposed in a complimentary fashion to "−" and "+" temperature icons 922. In some embodiments, one or more 3D printed surface features 930 may be disposed on a top surface of substrate 910 to provide a tactile indication of an icon 922. For example, substrate 910 includes two C-shaped 3D printed surface features 930 that provide a tactile indication of a volume slider icon 922 and a fan speed slider icon 922. As another example, substrate 910 includes a plurality of circular 3D printed surface features 930 that provide a tactile indication of various A/C icons 922 and a car icon 922.

Figure 10:
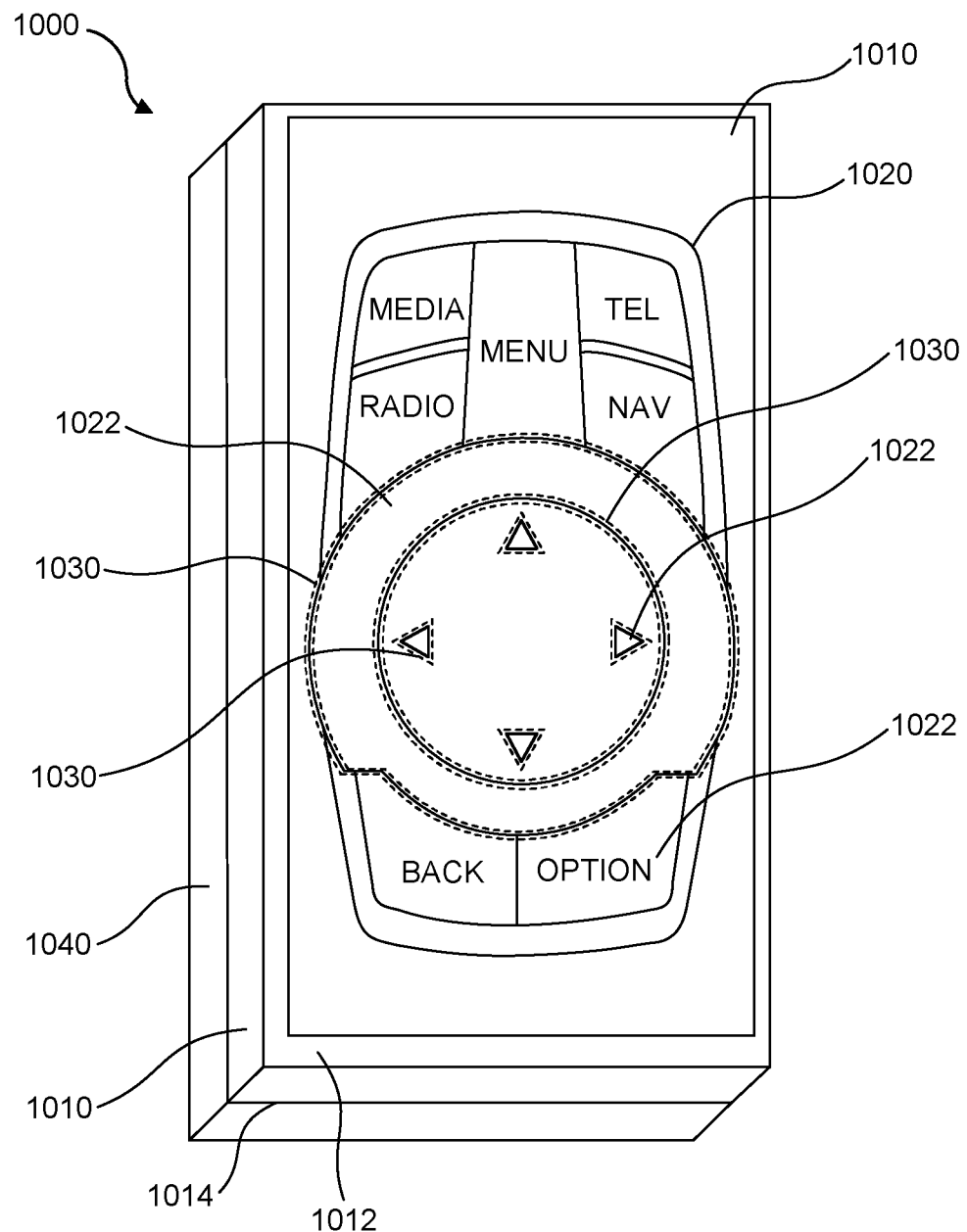
FIG. 10 shows a deadfront display according to some embodiments.

FIG. 10 illustrates a deadfront display 1000 according to some embodiments. FIG. 10 illustrates deadfront display 1000 when it is backlit with a graphic 1020 displayed through a substrate 1010 shown. Substrate 1010 may be the same as or similar to any substrate (e.g., substrate 110) discussed herein and includes a top surface 1012 and a bottom surface 1014 opposite top surface 1012. Graphic 1020 may be disposed on bottom surface 1014 of substrate 1010 and/or within substrate 1010 such that graphic 1020 may be viewed through top surface 1012. Graphic 1020 may include one or more icons 1022 that may be viewed through top surface 1012 when deadfront display 1000 is backlit. In some embodiments, graphic 1020 may include a plurality of separate graphics.

Deadfront display 1000 includes a deadfront assembly 1040 disposed over bottom surface 1014. Deadfront assembly 1040 includes various layers for creating a deadfront effect. For example, deadfront assembly 1040 may include a semi-transparent layer, a contrast layer, a color layer, and/or an opaque layer as described in International App. No. PCT/US18/50772, filed on Sep. 12, 2018, which is incorporated by reference in its entirety by reference thereto.

Display deadfront 1000 also includes at least one 3D printed surface feature 1030 (illustrated in broken lines) disposed on top surface 1012 of substrate 1010. In some embodiments, 3D printed surface feature(s) 1030 may be positioned on top surface 1012 in a complimentary fashion to all or a portion of graphic 1020 (e.g., an icon 1022 of graphic 1020). For example, deadfront display 1000 includes 3D printed surface features 1030 disposed in a complimentary fashion to a generally circular volume or scroll icon 1022. As another example, deadfront display 1000 includes 3D printed surface features disposed in a complimentary fashion to a four arrow icons 1022. 3D printed surface feature(s) 1030 create a haptic feel for a user touching top surface 1012 while preserving the appearance of a deadfronted material imagined on top surface 1012 (e.g., carbon fiber, stainless steel, wood, etc.) when deadfront display 1000 is not backlit.

Figure 11:
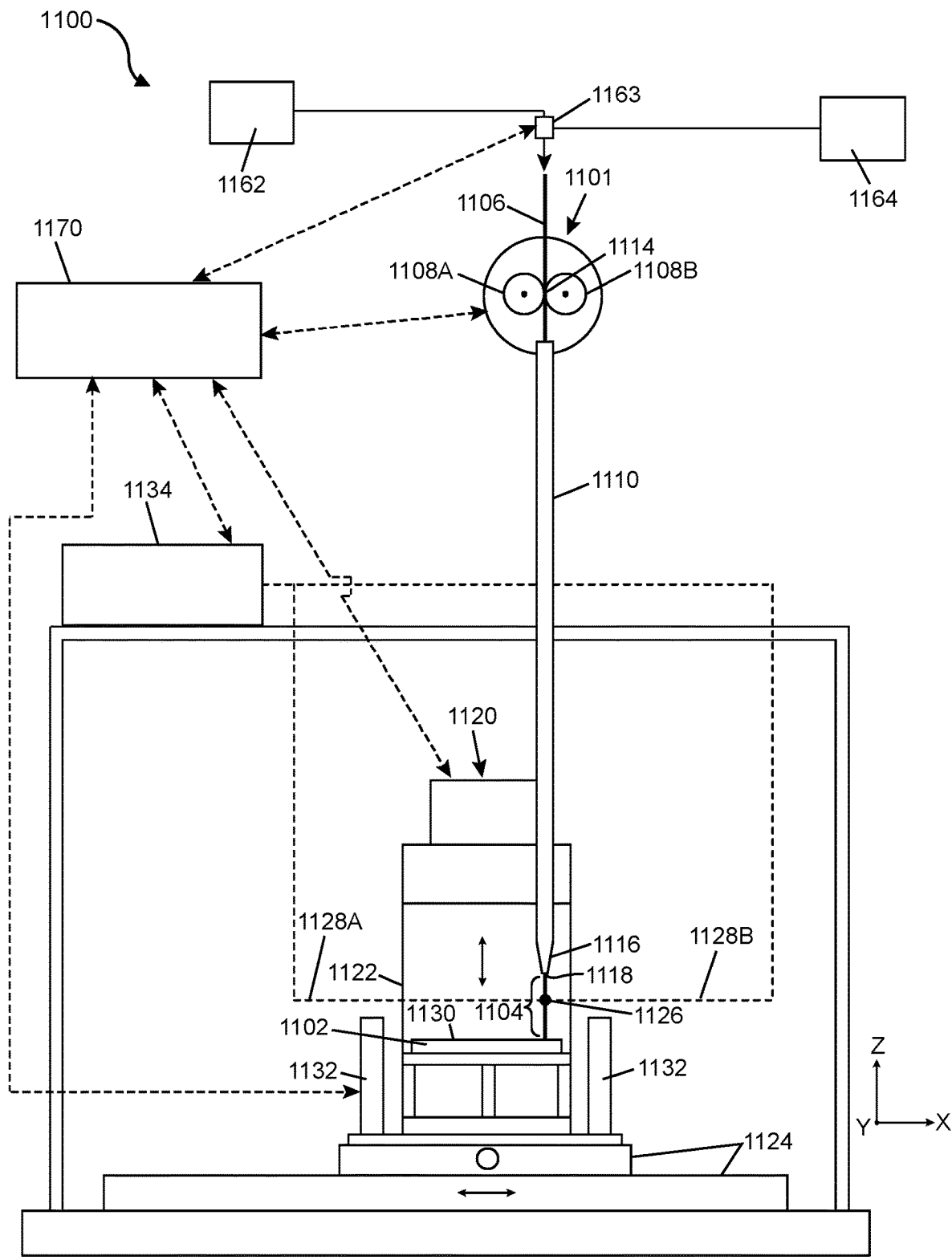
FIG. 11 shows a system for 3D printing a surface feature according to some embodiments.

FIG. 11 illustrates a system 1100 for printing a 3D surface feature according to some embodiments. System 1100 may be utilized to 3D print any surface feature discussed herein on surface of substrate such that the 3D printed surface feature is attached to the surface at a contact interface as discussed herein. System 1100 includes a feed system 1101 arranged above a build plate 1102. The area between feed system 1101 and build plate 1102 may be referred to as a build zone 1104. Feed system 1101 can be operated to feed a contiguous preformed material 1106 into build zone 1104. In some embodiments, feed system 1101 can be operated to feed a plurality of contiguous preformed materials 1106 into build zone 1104. Contiguous preformed material 1106 may be composed in whole or in part of any suitable glass or glass-ceramic material, including the glass and glass-ceramic materials descried herein.

In some embodiments, the diameter of a tube, rod, fiber, or bar may be in a range from 100 μm to 7 mm. In some embodiments, the thickness of the thin sheet and ribbon may be in a range from 10 μm to 7 mm. The length of preformed material 1106 can be variable. In some embodiments, preformed material 1106 is composed of glass or glass-ceramic. In some embodiments, preformed material 1106 may be composed of a viscoelastic material besides glass and glass-ceramic or may be composed of a composite material including a viscoelastic material as one component.

Feed system 1101 may include a pair of feed wheels 1108A, 1108B for advancing preformed material 1106 in a direction towards build zone 1104. In some embodiments, feed system 1101 may include a guide tube 1110 for guiding preformed material 1106 into build zone 1104. In some embodiments, guide tube 1110 has an internal longitudinal passage that is aligned to receive preformed material 1106 from feed wheels 1108A, 1108B. Guide tube 1110 may have a guide tip 1116 with a feed outlet 1118 that is sized and shaped to accommodate the cross-section of preformed material 1106, which may enable precise delivery of preformed material 1106 into build zone 1104. Feed outlet 1118, or wherever preformed material 1106 emerges from feed system 1101 into build zone 1104, may be referred to as the feed outlet of the feed system 1101.

In some embodiments, preformed material 1106 may be in a form that can be wound around a spool. In such embodiments, feed wheels 1108A, 1108B may pull a desired length of preformed material 1106 from the spool as needed. In some embodiments, preformed material 1106 may be in the form of a ribbon conveyed to feed system 1101. In some embodiments, the spacing 1114 between feed wheels 1108A, 1108B, i.e., where preformed material 1106 passes in between feed wheels 1108A, 1108B, may be adjustable so that feed wheels 1108A, 1108B can feed different preformed material diameters or thicknesses to guide tube 1110. Guide tube 1110 and guide tip 1116 may be interchangeable with other guide tubes and guide tips to allow delivery of the different preformed material diameters or thicknesses into build zone 1104.

In some embodiments, build plate 1102 may be mounted on a positioning system 1120. In some embodiments, positioning device 1120 is capable of translating build plate 1102 along three orthogonal directions, i.e., along X, Y, and Z axes. As an example, positioning system 1120 may include a Z stage 1122 to allow translation of build plate 1102 along the Z axis and an XY stage 1124 to allow translation of build plate 1102 in the XZ plane. Positioning system 1120 will allow relative motion between build plate 1102 and feed outlet 1118 in three orthogonal directions. Instead of mounting build plate 1102 on positioning system 1120, or in addition to mounting build plate 1102 on positioning system 1120, feed system 1101 may be mounted to a separate positioning system such that the position of feed outlet 1118 relative to build plate 1102 can be adjusted. However, it may be more convenient to move build plate 1102 relative to feed outlet 1118. In general, any method of effecting relative motion between build plate 1102 and feed outlet 1118 in any of three orthogonal directions may be used. Relative motion between feed outlet 1118 and build plate 1102 will allow preformed material 1106 to be deposited on build plate 1102 in a desired pattern.

In some embodiments, a hot spot 1126 is created in build zone 1104 between feed outlet 1118 and build plate 1102. In some embodiments, hot spot 1126 may be aligned with feed outlet 1118 such that preformed material 1106 passes from feed outlet 1118 through hot spot 1126 prior to reaching build plate 1102. In some embodiments, preformed material 1106 may be selectively heated to a viscous state by hot spot 1126. The term "selectively heated" means that the entire preformed material 1106 dispensed into build zone 1104 or just selected sections of preformed material 1106 dispensed into build zone 1104 may be heated to the viscous state. This also means that hot spot 1126 has to be controllable. For example, it should be possible to turn hot spot 1126 on or off or to control the temperature and size of hot spot 1126. In some embodiments, preformed material 1106 may be selectively heated to a temperature between the annealing point and up to the working point of the material in hot spot 1126. As used herein, the term "working point" means the temperature at which a glass or glass-ceramic material has a viscosity of about $10^4$ poises.

Hot spot 1126 is created by directing at least one energy source, including but not limited to, at least one laser beam into build zone 1104. In some embodiments, hot spot 1126 may be created using one or more laser beams from a laser delivery system, generally identified by the reference numeral 1134. As an example, FIG. 11 shows that two laser beams 1128A, 1128B may be used to create hot spot 1126 in some embodiments. Laser beams 1128A, 1128B approach build zone 1104 from opposed directions. Such opposed laser beams will facilitate uniform heating around the diameter or thickness of preformed material 1106 at hot spot 1126. In some embodiments, laser beams 1128A, 1128B provided by laser delivery system 1134 may be Gaussian beams, and the beam diameter of laser beams 1128A, 1128B at hot spot 1126 can be controlled. In some embodiments, the beam diameter of each laser beam 1128A, 1128B may be in the range of 1 to 2 times the thickness of preformed material 1106 to be processed by hot spot 1126. In some embodiments, system 1100 may include more than two laser beams 1128A, 1128B. For example, system 1100 may include four or more, or six or more laser beams 1128. Additional laser beams 1128 may facilitate the formation of a more uniform hot spot 1126. In embodiments with four laser beams 1128, system 1100 may include two pairs of opposing laser beams 1128. In embodiments with six laser beams 1128, system 1100 may include three pairs of opposing laser beams 1128. In some embodiments, laser beams 1128 may approach build zone 1104 in directions evenly radially separated from each other. For example, a system 1100 with four laser beams 1128 may include two pairs of opposing laser beams 1128 with each laser beam 1128 radially separated from adjacent laser beams 1128 by 90 degrees.

In some embodiments, hot spot 1126 may heat preformed material 1106 to a viscous state having a viscosity in the range of $10^4$ poises to $10^{7.6}$ poises, including subranges. For example, the viscosity may be $10^4$ poises, $10^5$ poises, $10^6$ poises, $10^7$ poises, or $10^{7.6}$ poises, or a viscosity within a range having any two of these values as endpoints. A viscosity within any of these ranges may result in a contact interface (e.g., contact interface 130) having desired dimensions, such as a desired minimum contact dimension 132. By controlling the dimensions of a contact interface, the contact interface can be optimized for a desired relationship between a contact interface's minimum contact dimension and the DOC of an compressive stress region for a 3D printed surface feature. In general, a lower viscosity will increase the area of a contact interface between a 3D printed surface feature and a substrate.

In some embodiments, the viscosity of preformed material 1106 may be varied as it is fed through build zone 1104. In such embodiments, the viscosity may be varied within any the other ranges discussed above. The viscosity of preformed material 1106 may be varied by varying a total input energy of laser beams 1128A/B. The total input energy is defined by at least: a laser power of laser beam(s) 1128A/B, a laser beam diameter of laser beam(s) 1128A/B, a movement speed of the build plate 1102 (i.e., a substrate), and a feed rate of contiguous preformed material 1106. Accordingly, the viscosity of preformed material 1106 may be varied by varying at least one of the laser power of laser beam(s) 1128A/B, the laser beam diameter of laser beam(s) 1128A/B, the movement speed of the build plate 1102 (i.e., a substrate), and the feed rate of contiguous preformed material 1106.

FIGS. 12A and 12B show laser delivery systems 1134 and 1134' according to some embodiments. In FIG. 12A, laser delivery system 1134 includes a laser source 1136 that generates a laser beam 1138. If preformed material 1106 is made of glass or glass-ceramic, laser source 1136 may be an infrared laser capable of generating an infrared laser beam, such as a $CO_2$ laser and the like. In general, laser source 1136 should be capable of generating a laser beam in a wavelength range that preformed material 1106 will absorb so as to allow preformed material 1106 to be selectively heated to a viscous state. For example, $CO_2$ laser emits wavelengths within the absorption range of glass and can be used for processing of glass materials. A beam splitter 1140 is arranged to split the laser beam 1138 into two separate laser beams 1128A, 1128B traveling in different directions, e.g., in orthogonal directions. In the arrangement shown in FIG. 12A, first laser beam 1128A is directed to a focusing lens 1142 by means of mirrors 1144, 1146, and focusing lens 1142 focuses first laser beam 1128A into build zone 1104. Similarly, second laser beam 1128B is directed to a focusing lens 1148 by means of mirrors 1150, 1152, 1154, and focusing lens 1148 focuses second laser beam 1128B into build zone 1104. The focused laser beams 1128A, 1128B form hot spot 1126 within which preformed material 1106 can be selectively heated to a viscous state.

In laser delivery system 1134', a beam combiner 1155A combines first laser beam 1128A with a secondary laser beam 1156A. The combined laser beam 1128A' is directed and focused into build zone 1104 using mirrors 1144, 1146 and focusing lens 1142. Secondary laser beam 1156A may be generated by a secondary laser source 1158A. In some embodiments, secondary laser beam 1156A may have a different wavelength than first laser beam 1128A. For example, secondary laser beam 1156A may be in a wavelength range that preformed material 1106 will not absorb (or significantly absorb), while first laser beam 1128A may be in a wavelength range that preformed material 1106 absorbs. In some embodiments, secondary laser beam 156A has a wavelength in the visible range (about 380 nm to about 700 nm), while first laser beam 1128A has a wavelength in the infrared range. In such embodiments, secondary laser source 1158A may be a Helium-neon (HeNe) laser or other suitable visible laser. Combining a visible laser beam 1156A with an invisible laser beam 1128A will produce a combined laser beam 1128A' that is visible. This can help align the invisible laser beam 1128A with the target location where hot spot 1126 is to be created. The visible laser beam 1156A will generally not have any significant effect on the temperature of hot spot 1126.

Similarly, a beam combiner 1155B combines second laser beam 1128B with a secondary laser beam 1156B, and the combined laser beam 1128B' is directed and focused into build zone 1104 using mirrors 1152, 1154 and focusing lens 1148. Secondary laser beam 1156B may be generated by a secondary laser source 1158B. Secondary laser beam 1156B and secondary laser source 1158B may have the same characteristics as described above for secondary laser beam 1156A and secondary laser source 1158B.

Variations to laser delivery systems 1134, 1134' are possible. One possible variation is to use separate laser sources to generate the separate laser beams 1128A, 1128B, i.e., instead of splitting a single laser beam 1138 into two separate laser beams 1128A, 1128B. Another possible variation is to use beam shapers to shape laser beams 1128A, 1128B (or the combined beams 1128A', 1128B') focused into build zone 1104 into a non-round shape, such as rectangular shape or elliptical shape. Such non-round shape may be useful when preformed material 1106 is a flat fiber or the side of preformed material 1106 in opposed relation to the laser beam is flat. Another variation is to use more than two laser delivery paths to deliver laser beams to preformed material 1106. This variation may be useful if preformed material 1106 is a thin sheet or has a relatively large width compared to the spot size of the laser beam (or combined beam). As illustrated in FIG. 12C, laser beams may be delivered to one side of preformed material 1106 along multiple beam paths 1160A1, 1160A2, 1160A3 and to the other side of preformed material 1106 along multiple beam paths 1160B1, 1160B2, 1160B3. Three beam paths are shown on each side of preformed material 1106 for illustration purposes. In general, as many beam paths as needed may be used to ensure uniform heating of preformed material 1106 across the width of preformed material 1106. Using the same coordinate system as in FIG. 11, the width of preformed material 1106 is taken to be the dimension along the Y axis.

Returning to FIG. 11, hot spot 1126 is created in build zone 1104 at a select location between feed outlet 1118 and build surface 1130, i.e., top surface, of build plate 1102. It is preferable that hot spot 1126 is not created on build surface 1130 of build plate 1102 or within build plate 1102 since this can cause undesired heating and/or ablation of build plate 1102. In some embodiments, the grazing angles of the laser beams, i.e., the angles between laser beams 1128A, 1128B and build surface 1130 of build plate 1102, are selected such that laser beams 1128A, 1128B will not impinge on build surface 1130 of build plate 1102. This is to avoid creation of a hot spot on build surface 1130 of build plate 1102 or within build plate 1102. Laser beams 1128A, 1128B may be parallel or at shallow angles (near parallel) to build surface 1130 to avoid impinging on build surface 1130 of build plate 1102. The appropriate shallow angles can be determined by geometry.

In some embodiments, the distance between hot spot 1126 and build surface 1130 may vary from ⅓ to 1 times the thickness (or diameter) of preformed material 1106 delivered through hot spot 1126. In general, the distance between hot spot 1126 and build surface 1130 will depend on the type of bonding surface desired between layers of preformed material deposited on the build surface 1130. The interface between build surface 1130 and the first layer of a 3D structure is a "bonding surface." Each boundary between layers of a 3D structure also constitutes a "bonding surface."

Heaters 1132 may be positioned near build plate 1102 to create a controlled thermal environment around build plate 1102. The controlled thermal environment may allow build plate 1102 to be maintained in a certain temperature range while depositing preformed material 1106 on build plate 1102. The controlled thermal environment may minimize stresses in the material deposited on build plate 1102 by preventing rapid cooling of the material, particularly if the material is glass or glass-ceramic. In some embodiments, build plate 1102 may be made of glass, and heaters 1132 may maintain the temperature of build plate 1102 at substantially the annealing point of the glass (i.e., the temperature at which the glass reaches a viscosity of $10^{13.4}$ poises). "Substantially" may mean, for example, within +/−20° C. of the annealing point of the glass. In some embodiments, build plate 1102 may be made of glass-ceramic, and heaters 1132 may maintain the temperature of build plate 1102 just below the sintering point of the glass-ceramic. For example, the glass-ceramic build plate may be maintained at 0.1 to 10° C. below the sintering point. Another possibility is to control the temperature of build plate 1102 such that the temperature differential between build plate 1102 and the material deposited on build plate 1102 is minimized.

In some embodiments, a pressure source 1162 or vacuum source 1164 may be connected to preformed material 1106 if preformed material 1106 is a hollow fiber. A suitable control valve 1163 may determine which of pressure source 1162 and vacuum source 1164 is connected to preformed material 1106. While feeding preformed material 1106 into build zone 1104, pressure or vacuum can be selectively applied to the hollow core of preformed material 1106 to expand or collapse the core, respectively. Typically, the expansion or collapse of the hollow core will occur in build zone 1104, where preformed material 1106 will be at a temperature at which it can be shaped due to the heating by hot spot 1126. This process will allow further shaping of a section of preformed material 1106 prior to depositing the section of preformed material 1106 on build plate 1102.

A process for printing a 3D surface feature according to some embodiments may include describing a set of object layers that can be stacked one on top of another to form the 3D surface feature. The set of object layers contains at least two object layers. Each object layer may be a cross-sectional slice of the 3D surface features. The description of each object layer includes the geometric data needed to construct the object layer. From the description of each object layer, the shape of the layer and features in the layer may be determined. Features may be, for example, partial-depth holes, through-holes, channels, voids, engraved marks, and the like. The description may include other information such as thickness of the object layer.

In some embodiments, a 3D surface features may be described as a set of object layers by drawing each object layer of the 3D surface feature using a suitable drawing or illustration tool. Each object layer may be drawn just prior to building the object layer or as the object layer is being built, or all the object layers may be drawn at the same time and stored for later use.

In some embodiments, a 3D surface feature may be described as a set of object layers by constructing a model of the 3D surface feature using a CAD software (or, in general, solid modeling software). The CAD software may output a .stl file containing a tessellated model of the 3D surface feature. A tessellated model is an array of triangles representing the surfaces of the CAD model. The .stl file would contain the coordinates of the vertices of these triangles and indices indicating the normal of each triangle. The tessellated model may be sliced into layers using a suitable slicing software, where each slice would represent an object layer of the 3D surface feature.

In some embodiments, a 3D surface feature may be described as a set of object layers by scanning a prototype of the 3D surface feature and deriving the definition of the object layers from the scanned image using a suitable software system.

The process for printing a 3D surface feature may include determining the type of preformed material(s) to be used in forming the one or more layers of the feature. The process for printing the 3D surface feature may include using the geometric data for the layer(s), and the type of preformed material(s) to be used in forming the layer(s) to determine the material deposition pattern for the layer(s).

The process for printing a 3D surface feature may include determining, for the one or more layers, the relative motion between build plate 1102 and feed outlet 1118 to form the material deposition pattern for the layer(s). The process for printing a 3D surface feature may include determining, for each of the one or more layers, the laser power required to form hot spot 1126 based on the preformed material type and the feed rate of preformed material 1106 into build zone 1104 based on the preformed material type and the material deposition pattern, the "deposition distance" during deposition of the preformed material, and the hot spot distance during deposition of the preformed material. The "deposition distance" is the vertical distance through which the preformed material travels from feed outlet 1118 to build surface 1130 or to a topmost object layer on build surface 1130. The deposition distance can be set prior to deposition of each object layer and varied during deposition of each object layer to achieve a specified thickness profile of the object layer or to achieve a desired bonding surface between object layers. The "hot spot distance" is the vertical distance between hot spot 1126 and build surface 1130 or the topmost object layer on build surface 1130. In some embodiments, the hot spot distance and laser power may be selected to achieve full transparency when working with glass or glass-ceramic preformed materials. For example, fully transparent glass may be achieved if the temperature of hot spot 1126, as determined by the laser power used in creating hot spot 1126, is set to just below the working point of the preformed glass, e.g., 5 to 10° C. below the working point, and the hot spot distance is in a range from $\frac{1}{3}$ to 1 of the diameter (or thickness) of the preformed glass.

System 1100 may include a controller 1170 that manages the building of a 3D surface feature using the "build data," i.e., the description of the object layer(s) and other related data, such as preformed material type, preformed feed rate, laser power, deposition distance, and so forth, as described above. Controller 1170 may read the build data from a suitable storage or may receive the build data as needed from an application or through user input. Controller 1170 may make various decisions on when and where to send command signals in system 1100. Controller 1170 may send signals to feed system 1101 to feed one or more preformed materials into build zone 1104 at a specified feed rate. Controller 1170 may send signals to laser delivery system 1134 to deliver laser beams 1128A, 1128B at the appropriate power level to achieve hot spot 1126. During deposition of preformed material(s) 1106, controller 1170 may send signals to positioning system 1120 to move build surface 1130 relative to feed outlet 1118 in a particular pattern appropriate for the object layer being built. Controller 1170 may also send signals to positioning system 1120 to adjust the deposition distance. Controller 1170 may also send signals to control valve 1163 to connect either of pressure source 1162 or vacuum source 1164 to preformed material 1106. Controller 1170 may also send signals to heaters 1132 to maintain build surface 1130 at a certain temperature. System 1100 may include appropriate communication links between controller 1170 and the other system components. An alternative to controlling positioning system 1120 via controller 1170 is to connect positioning system 1120 to a drawing tool. In such embodiments, as an object layer is drawn, the drawing action may be translated into relative motion between build surface 1130 and feed outlet 1118.

To build an object layer using system 1100, hot spot 1126 is created between feed outlet 1118 and build surface 1130. The laser power delivered to hot spot 1126 will depend on the preformed material(s) to be used in building the object layer. The hot spot distance, i.e., the distance between hot spot 1126 and build surface 1130, and the deposition distance, i.e., the distance between feed outlet 1118 and build surface 1130, are set to predetermined values, which may be based on build data. For example, if forming a fully transparent glass surface feature, the hot spot distance may be in a range from $\frac{1}{3}$ to 1 of the thickness (or diameter) of the preformed material.

Feed system 1101 is used to feed a select preformed material 1106 into build zone 1104 at a feed rate appropriate for an object layer. Preformed material 1106 is selected based on the build data for the object layer. For illustration purposes, preformed material 1106 may be made of glass. In one example, which is not to be considered as limiting, the glass may be selected from Corning EXG, 714 AVC, Gorilla glasses, silica, and pyrex. The feed rate of preformed material 1106 into build zone 1104 may be selected based on the type of preformed material 1106 and the material deposition pattern of the object layer. The feed rate may also be correlated to the desired viscosity of the preformed material at hot spot 1126. In some embodiments, the feed rate, which may be related to the rotational speed of feed wheels 1108A, 1108B, may be in a range from 1 mm/s (millimeters per second) to 5 mm/s. In some cases, more than one preformed material 1106 may be needed to complete an object layer. In such cases, the desired preformed materials may be fed into build zone 1104 at a predetermined sequence specified in the build data. Where multiple preformed materials are used, there is liberty in selecting the material type, cross-sectional shape, and dimensions of the preformed materials, thereby enabling great complexity in printing of an object layer.

Each preformed material 1106 passed into build zone 1104 is selectively heated to a viscous state (or to a temperature between the annealing point and up to the working point of the preformed material) at hot spot 1126. In some embodiments, for the glasses listed above, a laser power range of 10 W to 45 W may be used to create hot spot 1126. In some embodiments, the laser power may be in the range of 10 W to 80 W, including subranges. For example, the laser power may be 10 W, 15 W, 20 W, 25 W, 30 W, 35 W, 40 W, 45 W, 50 W, 55 W, 60 W, 65 W, 70 W, 75 W, or 80 W, or within a range having any two of these values as end points. The selectively heated preformed material 1106 is then deposited on build surface 1130 of build plate 1102 in a material deposition pattern corresponding to an object layer.

Figure 13:
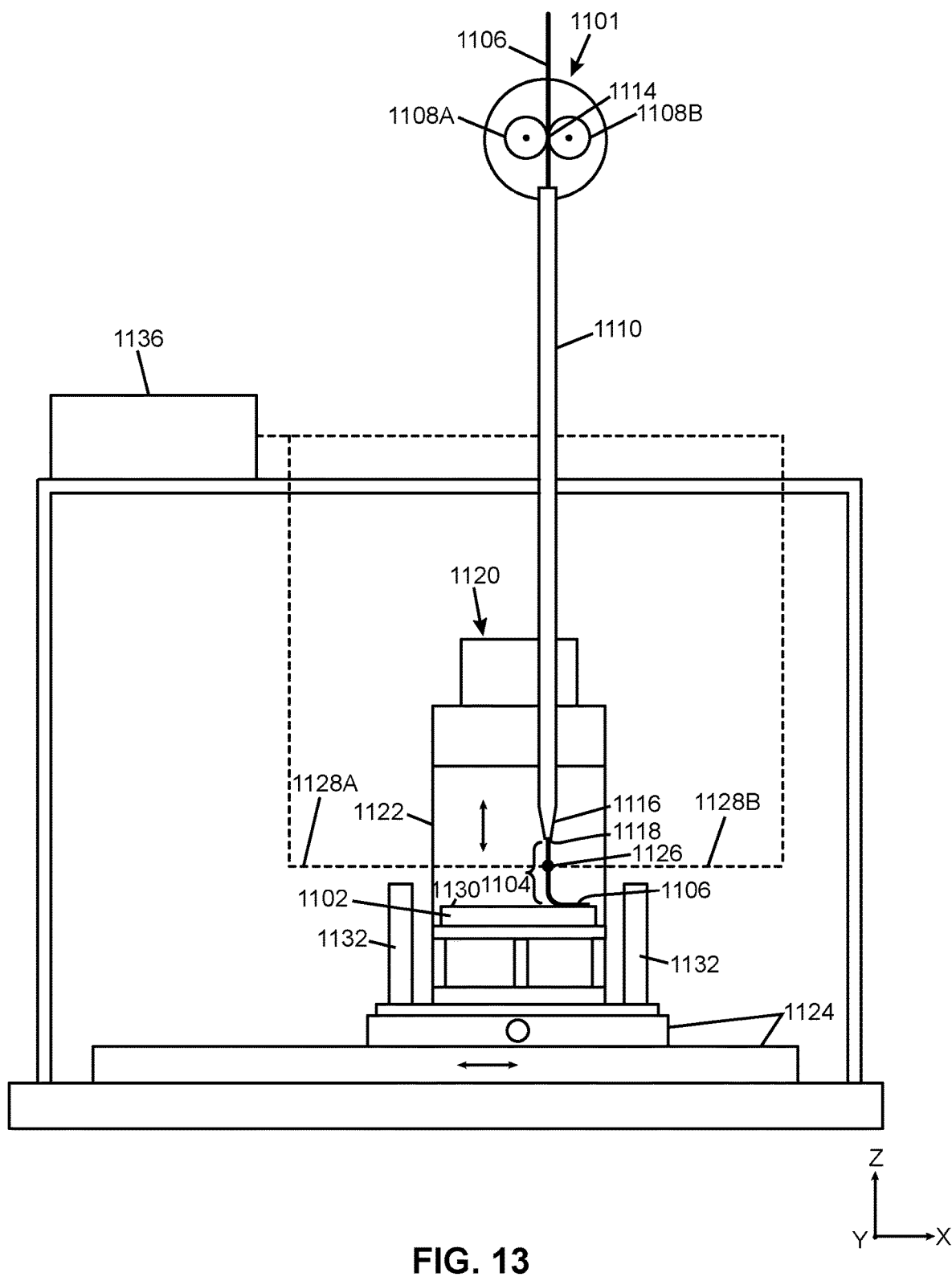
FIG. 13 shows a preformed material being deposited on a build plate according to some embodiments.
Figure 14A:
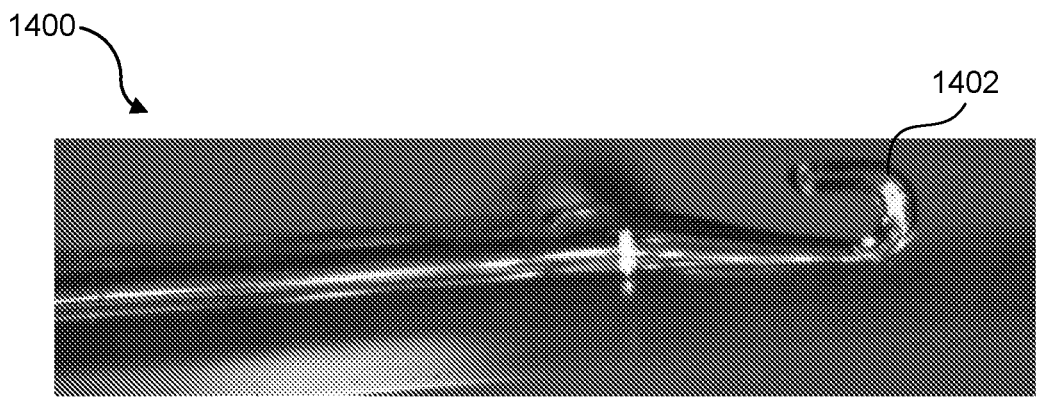
FIGS. 14A-14D are images of edge geometries for 3D printed surface features according to some embodiments.
Figure 14B:
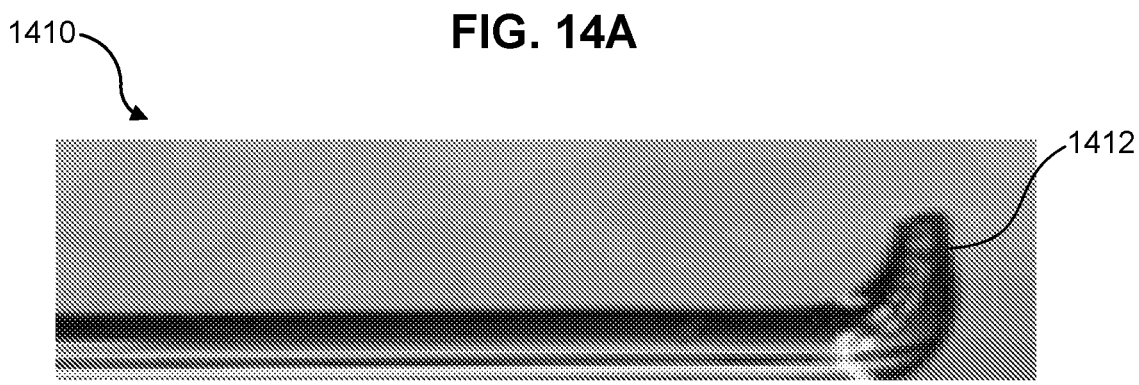
Figure 14C:
Figure 14D:
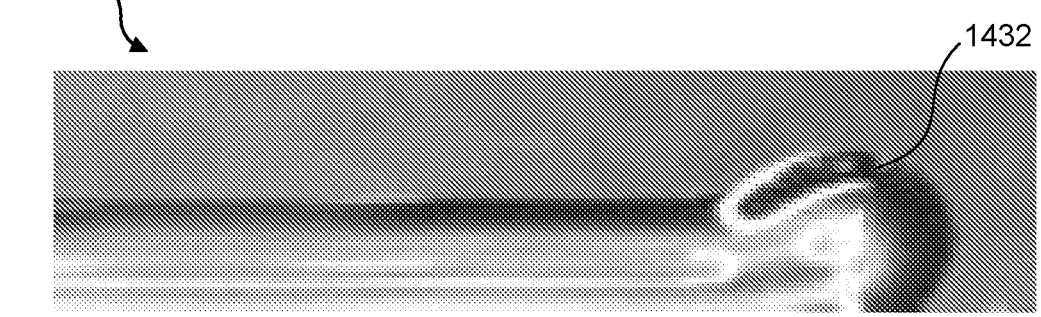

For illustration purposes, FIG. 13 shows preformed material 1106 traversing the deposition distance (i.e., the distance between feed outlet 1118 and build surface 1130), passing through hot spot 1126, and being deposited on build surface 1130 of build plate 1102. Relative motion between feed outlet 1118 and build plate 1102 controls how preformed material 1106 is laid on build surface 1130 to form the desired material deposition pattern for an object layer. It should be noted that any translation of feed outlet 1118 will need to be synchronized with the focal points of laser beams 1128A, 1128B such that hot spot 1126 created by laser beams 1128A, 1128B is aligned with feed outlet 1118. If the relative motion between feed outlet 1118 and build plate 1102 is restricted to moving build plate 1102 relative to feed outlet 1118, then it may not be necessary to adjust the position of hot spot 1126 or where laser beams 1128A, 1128B are focused.

In some embodiments, after the material deposition pattern for an object layer is complete, features may be formed in the material deposited on build plate 1102 to complete the object layer. The features formed will depend on the structure of the object layer. Features may be partial-depth holes, through-holes, voids, channels, engraved marks, and the like.

In some embodiments, after printing of the 3D surface feature is complete, the 3D surface feature may be annealed to prevent any residual stresses inside the bulk of the feature. This may be a useful step if the 3D surface feature is made of glass or glass-ceramic. For glass, the annealing process may include heating the 3D surface feature until the temperature reaches the annealing temperature (also called annealing point) at a viscosity of $10^{13}$ poise, where the glass is still too hard to deform but soft enough for the stresses to relax. The 3D surface feature is then allowed to heat-soak until its temperature is even throughout. The time necessary for this step varies depending on the type of glass and the maximum thickness of the surface feature. The surface feature is then slowly cooled at a predetermined rate until its temperature is below the strain point (viscosity of $10^{14.5}$ poises). Following this, the temperature can be safely lowered to room temperature at a rate limited by the heat capacity, thickness, thermal conductivity, and thermal expansion coefficient of the glass. After the annealing process, the surface feature can be cut to size, drilled, or polished.

In some embodiments, an additional step may be taken to separate the 3D surface feature from build plate 1102 if build plate 1102 is not desired as part of a final glass article. One possible method for doing this is to make build plate 1102 of a material that is different from that of the 3D surface feature (or the preformed material(s) used in building the 3D surface feature) and then separate build plate 1102 from the 3D surface feature by selective etching of the build plate 1102. In some embodiments, build plate 1102 may be made of a glass that is soluble in a select solvent, and the 3D surface feature may be made of glass or glass-ceramic that is insoluble in the select solvent. In such embodiments, build plate 1102 can be removed from the 3D surface feature by dissolving build plate 1102 in the select solvent. Another possible method is to separate build plate 1102 from the 3D surface feature by machining techniques, such as grinding, polishing, and the like.

The preformed material(s) used in building the 3D surface features discussed herein may be transparent glass or glass-ceramic, which would enable building of 3D glass or glass-ceramic surface features that are transparent. The transparency of the preformed material(s) may be preserved in the printed 3D surface feature because the printing method avoids use of binders and powders while building object layers, that is, the transparency of the 3D surface feature will be nominally the same as the transparency of the preformed material(s) used in building the 3D surface feature. In some embodiments, a 3D surface feature may be considered transparent if it has average transmittance of 80% or more in the wavelength range of 390 nm to 700 nm through a 1.0 mm thick piece of a material as measured by a spectrophotometer. In some embodiments, a 3D surface feature may be considered transparent if visibility through the 3D surface feature is without optical distortion. In some embodiments, a 3D surface feature may be considered transparent if there are no visible interfaces along one or more axes of the 3D surface feature.

A 3D surface feature made by the process and system described above may also be smooth due to the preformed material(s) used in building the 3D surface feature being smooth and/or due to fire-polishing of the 3D surface feature. In some embodiments, fire-polishing may be carried out using a laser beam. A 3D surface feature made by the process and system described herein will not require sintering if the preformed material(s) are already consolidated, which would avoid the shrinkage of parts typically observed with 3D printing methods using loose powder as raw material.

In some embodiments, the edge geometry at endpoints (e.g., endpoints 127) of a 3D printed surface feature may be tailored to create an edge geometry different from the cross-sectional shape of the 3D printed surface feature between the endpoints. Such edge geometries may be have desired aesthetic and/or tactile properties. The edge geometry at endpoints of a 3D printed surface feature may be tailored by (i) varying the stage speed (e.g., speed of XY stage 1124 and/or Z stage 1122 in FIG. 11) (ii) varying the stage direction (e.g., direction of XY stage 1124 and/or Z state 1122 in FIG. 11) (iii) a down feed of a contiguous preformed material during printing (e.g., feeding contiguous preformed material 1106 at various speeds using feed system 1101 shown in FIG. 11), (iv) varying the viscosity of a contiguous preformed material in a build zone (e.g., build zone 1104) during printing, or (v) a combination of one or more of (i)-(iv).

FIGS. 14A-14D are images of some exemplary edge geometries according to some embodiments. Image 1400 shows a 3D printed surface feature having a hooked edge geometry 1402. Image 1410 shows a 3D printed surface feature having a raised edge geometry 1412. Image 1420 shows a 3D printed surface feature having a sloped edge geometry 1422. Image 1430 shows a 3D printed surface feature having rounded edge geometry 1432.

Aspect (1) pertains to a glass article comprising: a substrate comprising a surface; a 3D printed surface feature disposed on the surface, the 3D printed surface feature attached to the surface at a contact interface between the 3D printed surface feature and the surface, and the 3D printed surface feature comprising: a glass or a glass-ceramic, a compressive stress region at an exterior perimeter surface of the 3D printed surface feature, and a central tension region interior of the compressive stress region.

Aspect (2) pertains to the glass article of Aspect (1), wherein the 3D printed surface feature comprises the glass and the glass comprises an ion-exchangeable glass material.

Aspect (3) pertains to the glass article of Aspect (1), wherein the 3D printed surface feature comprises the glass-ceramic and the glass-ceramic comprises an ion-exchangeable glass-ceramic material.

Aspect (4) pertains to the glass article of any one of Aspects (1) through (3), wherein the 3D printed surface feature comprises a contiguous preformed material.

Aspect (5) pertains to the glass article of any one of Aspects (1) through (4), wherein: the contact interface has a minimum contact dimension, the compressive stress region has a maximum depth measured inward from the exterior perimeter surface at a direction orthogonal to the exterior perimeter surface, and the minimum contact dimension is at least three times greater than the maximum depth of the compressive stress region.

Aspect (6) pertains to the glass article of any one of Aspects (1) through (5), wherein the minimum contact dimension is at least four times greater than the maximum depth of the compressive stress region.

Aspect (7) pertains to the glass article of any one of Aspects (1) through (6), wherein the compressive stress region comprises a compressive stress of 400 MPa or more.

Aspect (8) pertains to the glass article of any one of Aspects (1) through (6), wherein the compressive stress region comprises a compressive stress of 500 MPa or more.

Aspect (9) pertains to the glass article of any one of Aspects (1) through (6), wherein the compressive stress region comprises a compressive stress of 700 MPa or more.

Aspect (10) pertains to the glass article of any one of Aspects (1) through (9), wherein the compressive stress region has a minimum depth of 10 microns or more.

Aspect (11) pertains to the glass article of any one of Aspects (1) through (9), wherein the compressive stress region has a minimum depth of 20 microns or more.

Aspect (12) pertains to the glass article of any one of Aspects (1) through (11), wherein the surface of the substrate comprises an ion-exchangeable glass material or an ion-exchangeable glass-ceramic material.

Aspect (13) pertains to the glass article of any one of Aspects (1) through (12), wherein the substrate comprises a compressive stress region at the surface.

Aspect (14) pertains to the glass article of Aspect (13), wherein the compressive stress region at the surface of the substrate and the compressive stress region at the exterior perimeter surface of the 3D printed feature are portions of a continuous compressive stress region.

Aspect (15) pertains to the glass article of any one of Aspects (1) through (14), comprising a coating layer disposed over the 3D printed surface feature.

Aspect (16) pertains to the glass article of any one of Aspects (1) through (15), comprising a color layer.

Aspect (17) pertains to the glass article of Aspect (16), wherein the color layer is disposed on a bottom surface of the substrate opposite the surface on which the 3D printed surface feature is disposed.

Aspect (18) pertains to the glass article of any one of Aspects (1) through (17), wherein the 3D printed surface feature comprises a colored glass or a colored glass-ceramic.

Aspect (19) pertains to the glass article of any one of Aspects (1) through (18), wherein the substrate is a curved substrate.

Aspect (20) pertains to the glass article of any one of Aspects (1) through (19), wherein a contact angle between the 3D printed surface feature and the substrate at the contact interface is less than 135 degrees.

Aspect (21) pertains to a method of making a glass article, the method comprising: 3D printing a glass or glass-ceramic feature on a surface of a substrate; and forming a compressive stress region at an exterior perimeter surface of the 3D printed glass or glass-ceramic feature.

Aspect (22) pertains to the method of Aspect (21), wherein the glass or glass-ceramic feature comprises an ion-exchangeable glass material or ion-exchangeable glass-ceramic material.

Aspect (23) pertains to the method of Aspect (21) or Aspect (22), wherein forming the compressive stress region comprises ion-exchanging the 3D printed glass or glass-ceramic feature on the surface of the substrate.

Aspect (24) pertains to the method of any one of Aspects (21) through (23), wherein the glass or glass-ceramic surface feature comprises a contiguous preformed material.

Aspect (25) pertains to the method of any one of Aspects (21) through (24), wherein: 3D printing the glass or glass-ceramic surface feature on the surface of the substrate attaches the 3D printed glass or glass-ceramic surface feature to the surface at a contact interface between the 3D printed glass or glass-ceramic surface feature and the surface, the contact interface has a minimum contact dimension, the compressive stress region has a maximum depth measured inward from the exterior perimeter surface at a direction orthogonal to the exterior perimeter surface, and the minimum contact dimension is at least three times greater than the maximum depth of the compressive stress region.

Aspect (26) pertains to the method of Aspect (25), wherein the minimum contact dimension is at least four times greater than the maximum depth of the compressive stress region.

Aspect (27) pertains to the method of any one of Aspects (21) through (26), wherein the 3D printing comprises: creating a hot spot in a build zone located between a feed outlet and the substrate; and feeding one or more preformed materials in a predetermined sequence through the feed outlet into the build zone and using the hot spot to selectively heat the one or more preformed materials to a viscous state.

Aspect (28) pertains to the method of Aspect (27), wherein creating the hot spot comprises directing at least one energy source into the build zone.

Aspect (29) pertains to a method of making a glass article, the method comprising: creating a hot spot in a build zone located between a feed outlet and a substrate, wherein creating the hot spot comprises directing at least one energy source into the build zone; and feeding a contiguous preformed glass or glass-ceramic material through the feed outlet into the build zone and using the hot spot to selectively heat the preformed material to a viscous state having a viscosity in the range of $10^4$ poises to $10^{76}$ poises; and forming a surface feature on a surface of the substrate by depositing a portion of the preformed material on the surface from the build zone and effecting a relative motion between the surface and the feed outlet during the depositing such that the first portion of preformed material forms the surface feature.

Aspect (30) pertains to the method of Aspect (29), comprising varying the viscosity of the preformed material during the feeding.

Aspect (31) pertains to the method of Aspect (29), wherein the at least one energy source comprises at least one laser beam and wherein the viscosity of the preformed material is varied by varying a total input energy of the at least one laser beam, and wherein the total input energy is defined by at least: a laser power of the at least one laser beam, a laser beam diameter of the at least one laser beam, a movement speed of the substrate, and a feed rate of the contiguous preformed glass or glass-ceramic material.

Aspect (32) pertains to the method of Aspect (29) or Aspect (30), wherein the viscosity of the preformed material is varied by varying a feed rate of the preformed material.

Aspect (33) pertains to the method of any one of Aspects (29) through (31), wherein the forming of the surface feature on the surface of the substrate creates a contact interface between the substrate and the surface feature, and wherein the contact interface comprises a contact angle of less than 135 degrees.

Aspect (34) pertains to a vehicle interior, comprising: a vehicle base; and a display mounted on the vehicle base, the display comprising a display module disposed over a bottom surface of a substrate, the substrate comprising: a 3D printed surface feature disposed on a top surface of the substrate opposite the bottom surface, the 3D printed surface feature attached to the top surface at a contact interface between the 3D printed surface feature and the second surface, and the 3D printed surface feature comprising: a glass or a glass-ceramic, a compressive stress region at an exterior perimeter surface of the 3D printed feature, and a central tension region interior of the compressive stress region.

Aspect (35) pertains to the vehicle interior of Aspect (34), wherein the display module is configured to display a graphic that may be viewed through the top surface of the substrate, and wherein the 3D printed surface feature is disposed on the top surface of the substrate in a complimentary fashion to the graphic.

Aspect (36) pertains to the vehicle interior of Aspect (35), wherein the graphic comprises an icon.

Aspect (37) pertains to the vehicle interior of any one of Aspects (34) through (36), wherein the vehicle base comprises a center console, a dashboard, a steering wheel, an arm rest, a pillar, a seat back, a floor board, a headrest, or a door panel.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A glass article comprising:
   a substrate comprising a surface;
   a 3D printed surface feature disposed on and extending from the surface, the 3D printed surface feature attached to the surface at a contact interface between the 3D printed and only a portion of the surface, the 3D printed surface feature comprising:
a glass or glass-ceramic,
a compressive stress region at an exterior perimeter surface of the 3D printed surface feature, and
a central tension region interior of the compressive stress region,
wherein the contact interface has a minimum contact dimension,
the compressive stress region has a maximum depth measured inward from the exterior perimeter surface at a direction orthogonal to the exterior perimeter surface, and
the minimum contact dimension is at least three times greater than the maximum depth of the compressive stress region.

2. The glass article of claim 1, wherein the 3D printed surface feature comprises one of
the glass and the glass comprises an ion-exchangeable glass material, and
the glass-ceramic and the glass-ceramic comprises an ion-exchangeable glass-ceramic material.

3. The glass article of claim 1, wherein the 3D printed surface feature comprises a contiguous preformed material.

4. The glass article of claim 1, wherein the minimum contact dimension is at least four times greater than the maximum depth of the compressive stress region.

5. The glass article of claim 1, wherein the compressive stress region comprises a compressive stress of 400 MPa or more, and the compressive stress region has a minimum depth of 10 microns or more.

6. The glass article of claim 1, wherein the surface of the substrate comprises an ion-exchangeable glass material or an ion-exchangeable glass-ceramic material.

7. The glass article of claim 6, wherein the substrate comprises a compressive stress region at the surface.

8. The glass article of claim 7, wherein the compressive stress region at the surface of the substrate and the compressive stress region at the exterior perimeter surface of the 3D printed feature are portions of a continuous compressive stress region.

9. The glass article of claim 1, comprising a coating layer disposed over the 3D printed surface feature.

10. The glass article of claim 1, comprising a color layer.

11. The glass article of claim 10, wherein the color layer is disposed on a bottom surface of the substrate opposite the surface on which the 3D printed surface feature is disposed.

12. The glass article of claim 1, wherein the 3D printed surface feature comprises a colored glass or a colored glass-ceramic.

13. The glass article of claim 1, wherein the substrate is a curved substrate.

14. The glass article of claim 1, wherein a contact angle between the 3D printed surface feature and the substrate at the contact interface is less than 135 degrees.

15. A method of making a glass article, the method comprising:
3D printing a glass or glass-ceramic feature on and extending from a surface of a substrate such that the 3D printed glass or glass-ceramic feature is attached to the surface a contact interface between the 3D printed glass or glass-ceramic feature and only a portion of the substrate; and
forming a compressive stress region at an exterior perimeter surface of the 3D printed glass or glass-ceramic feature defining a central tension region interior thereof,
wherein the contact interface has a minimum contact dimension,
the compressive stress region has a maximum depth measured inward from the exterior perimeter surface at a direction orthogonal to the exterior perimeter surface, and
the minimum contact dimension is at least three times greater than the maximum depth of the compressive stress region.

16. The method of claim 15, wherein forming the compressive stress region at an exterior perimeter surface of the 3D printed glass or glass-ceramic feature comprises an ion-exchange process.

17. A vehicle interior, comprising:
a vehicle base; and
a display mounted on the vehicle base, the display comprising a display module disposed over a bottom surface of the substrate, the substrate comprising:
a 3D printed surface feature disposed on and extending from a top surface, the 3D printed surface feature attached to the top surface at a contact interface between the 3D printed and only a portion of the top surface, the 3D printed surface feature comprising:
a glass or glass-ceramic,
a compressive stress region at an exterior perimeter surface of the 3D printed surface feature, and
a central tension region interior of the compressive stress region,
wherein the contact interface has a minimum contact dimension,
the compressive stress region has a maximum depth measured inward from the exterior perimeter surface at a direction orthogonal to the exterior perimeter surface, and
the minimum contact dimension is at least three times greater than the maximum depth of the compressive stress region.

18. The vehicle interior of claim 17, wherein the display module is configured to display a graphic that may be viewed through the top surface of the substrate, and wherein the 3D printed surface feature is disposed on the top surface of the substrate in a complimentary fashion to the graphic.

19. The vehicle interior of claim 18, wherein the graphic comprises an icon.

20. The vehicle interior of claim 17, wherein the vehicle base comprises a center console, a dashboard, a steering wheel, an arm rest, a pillar, a seat back, a floor board, a headrest, or a door panel.

* * * * *